United States Patent [19]

Koch et al.

[11] 4,180,314
[45] Dec. 25, 1979

[54] APPARATUS FOR VARYING PICTURE SIZE BEFORE OR AFTER FILM ADVANCE

[76] Inventors: Carl Koch, Im Santenbuhl, Stetten; Rolf Meyer, Hohlenbaumstrasse 81, Schaffhausen, both of Switzerland

[21] Appl. No.: 874,577

[22] Filed: Feb. 2, 1978

[30] Foreign Application Priority Data

Feb. 7, 1977 [CH] Switzerland .......................... 1442/77

[51] Int. Cl.² .............................................. G03B 1/42
[52] U.S. Cl. .................................................... 354/159
[58] Field of Search ............... 354/159, 212, 213, 214, 354/216, 218; 352/80

[56] References Cited

U.S. PATENT DOCUMENTS

| | | | |
|---|---|---|---|
| 2,233,238 | 2/1941 | Baumgärtner | 354/159 |
| 2,247,104 | 6/1941 | Takács | 354/159 |
| 2,377,341 | 6/1945 | Hannum | 354/159 |

FOREIGN PATENT DOCUMENTS

| | | | |
|---|---|---|---|
| 527498 | 10/1940 | United Kingdom | 354/159 |
| 684916 | 12/1952 | United Kingdom | 354/159 |

*Primary Examiner*—John Gonzales
*Assistant Examiner*—Shelley Wade
*Attorney, Agent, or Firm*—Watson, Cole, Grindle & Watson

[57] ABSTRACT

The apparatus includes an image field limiting frame and at least one movable mask for the purpose of varying picture size in a line parallel to the direction of film travel and means to control film transport steps proportional to the picture window left open by the mask. It also includes means to directly transport the film in either the forward or reverse direction during picture size adjustment so that the forward edge of the film matches the forward edge of the picture window. In this manner, it is possible to execute picture size changes at anytime, even after operation of the film transport, without waste of film or overlap of sequential pictures.

21 Claims, 24 Drawing Figures

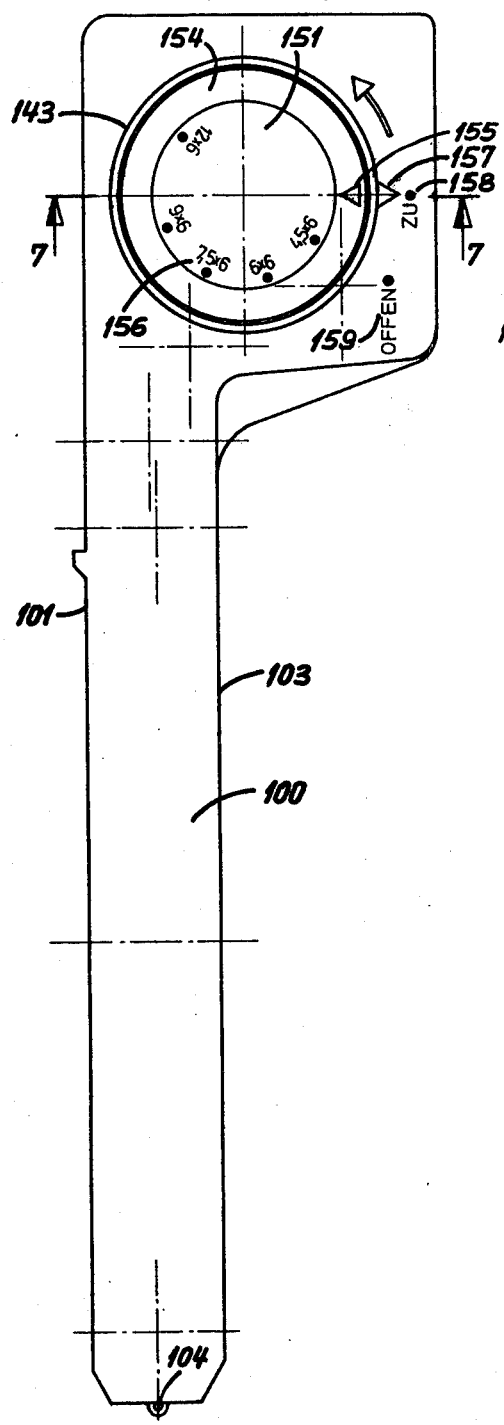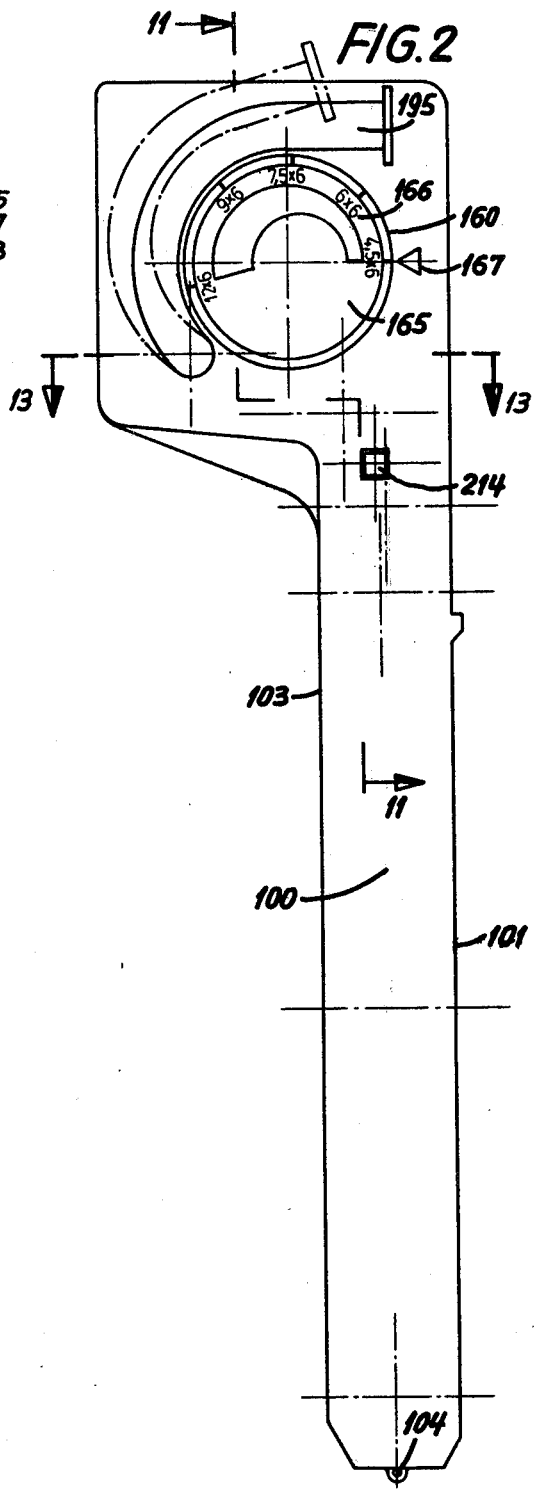

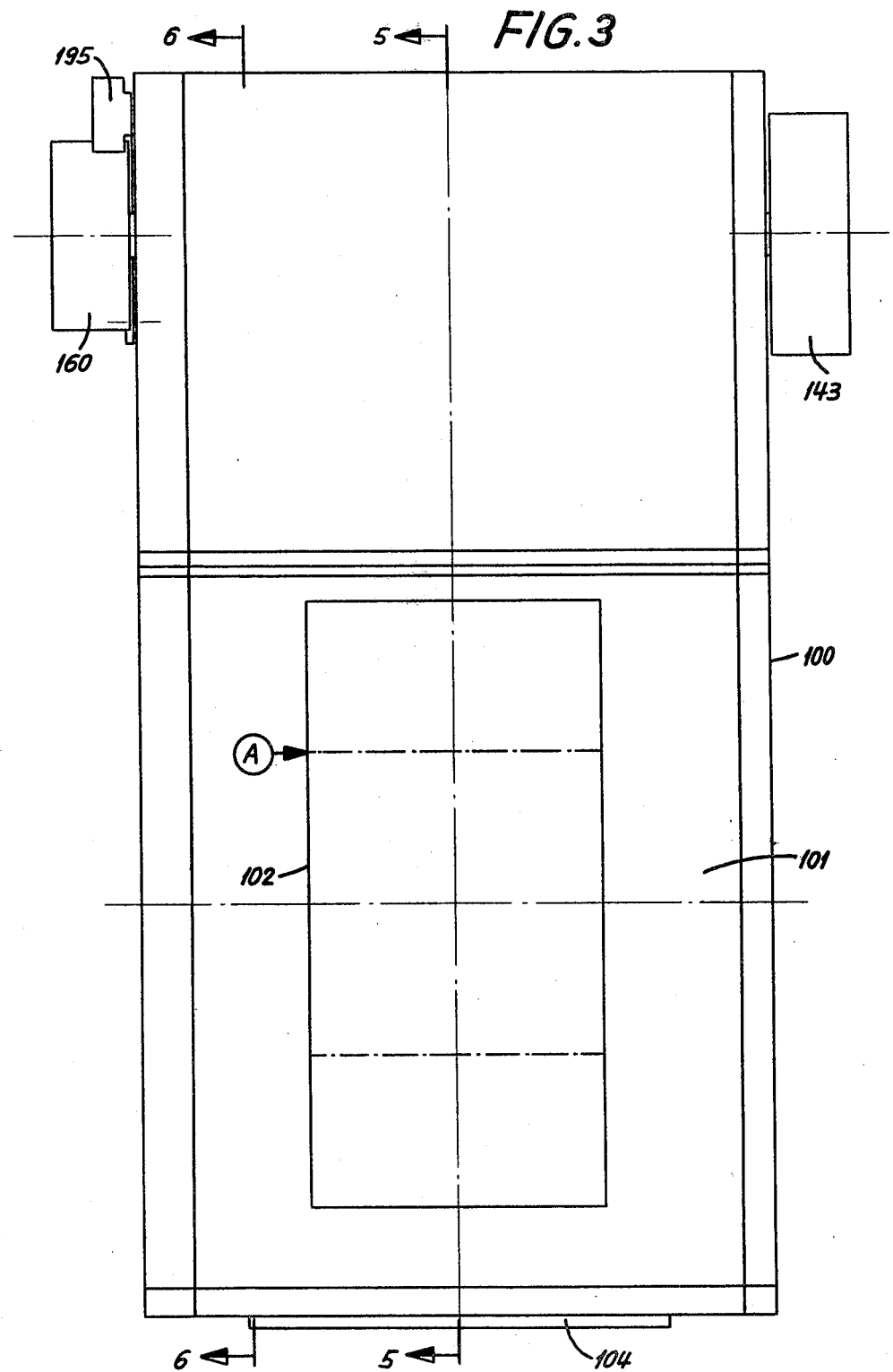

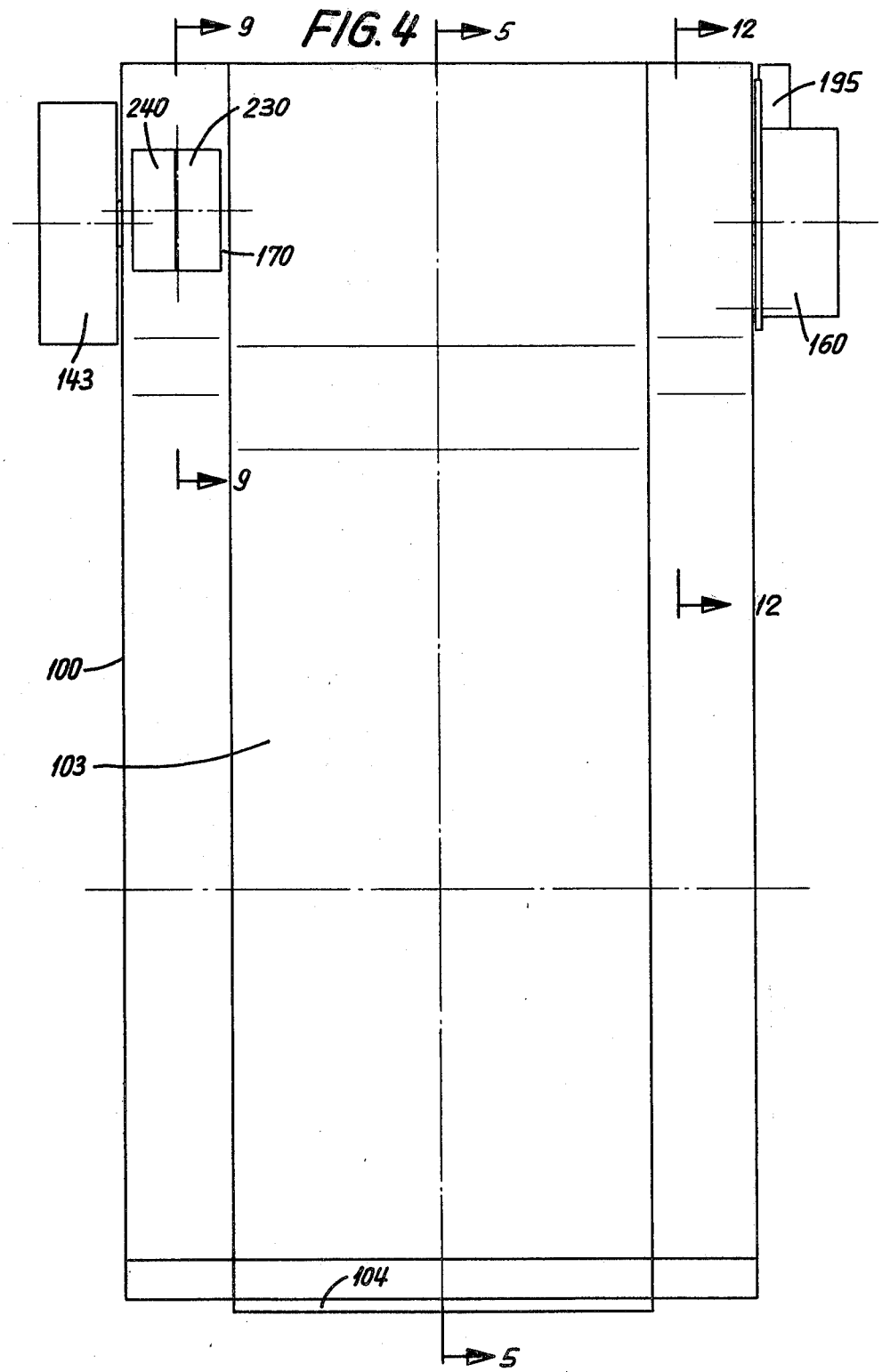

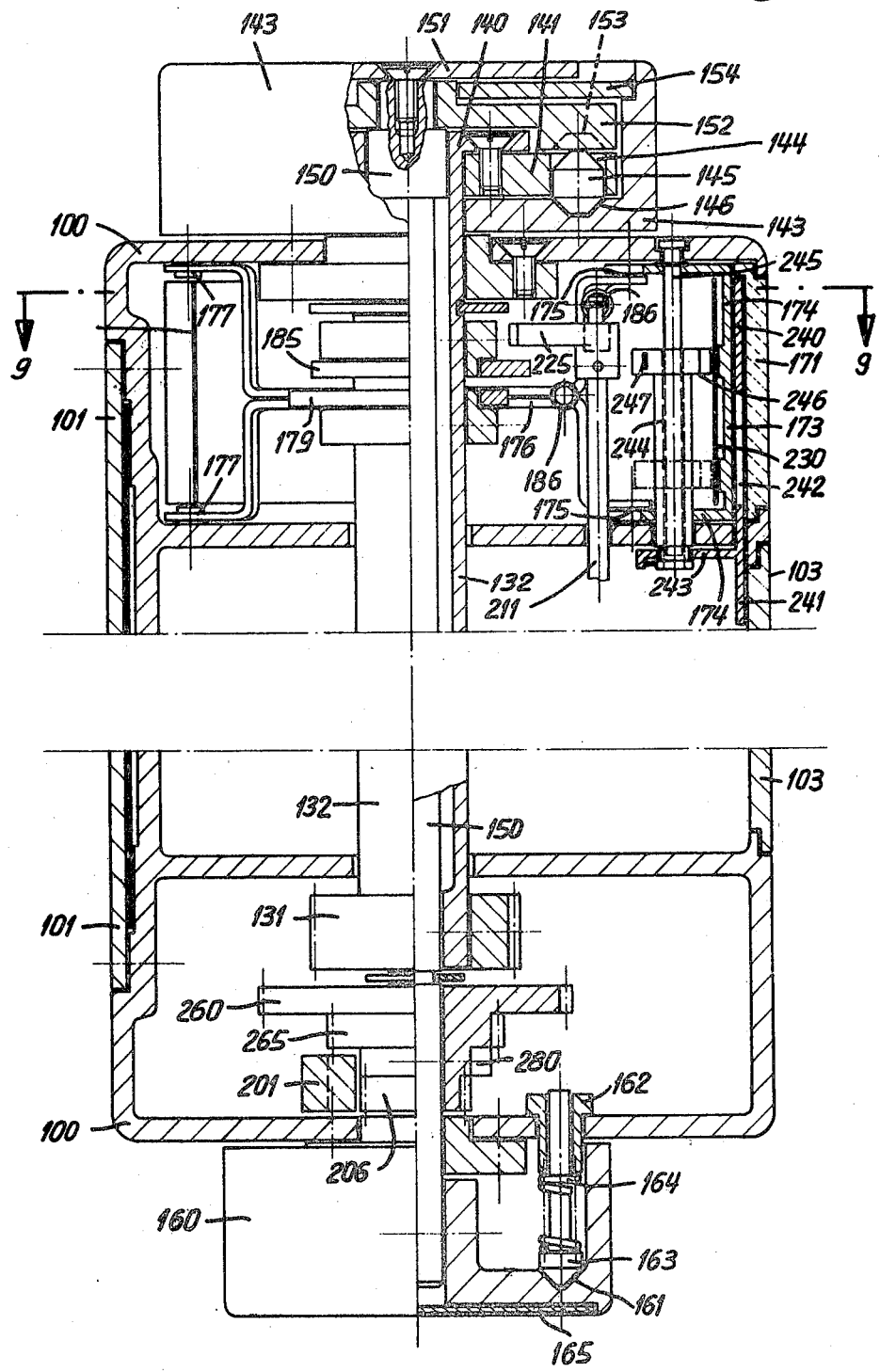

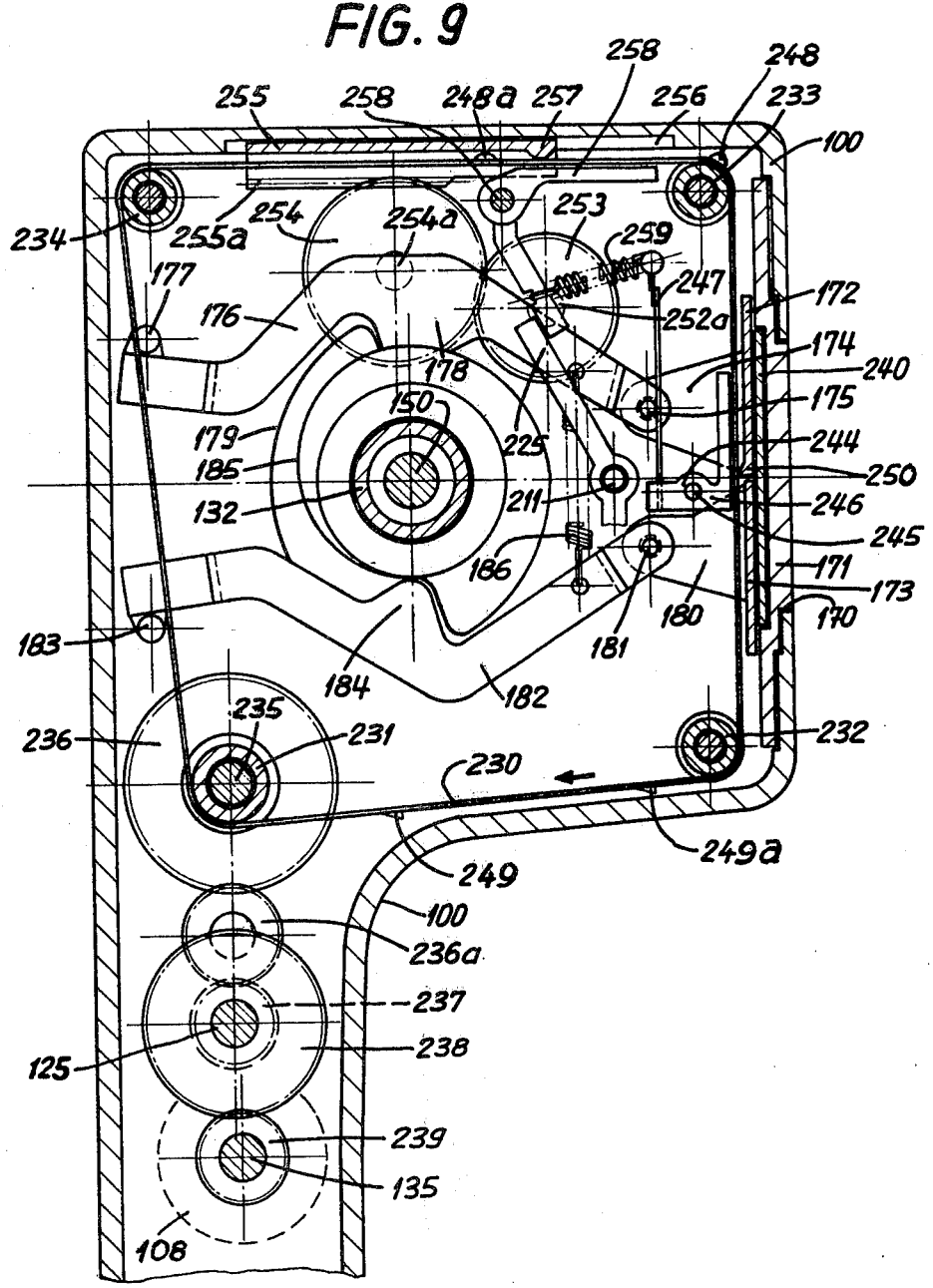

APPARATUS FOR VARYING PICTURE SIZE BEFORE OR AFTER FILM ADVANCE

BACKGROUND OF THE INVENTION

The present invention is directed to a mechanism for making photographic exposures on a strip-shaped light-sensitive material. The mechanism includes an image-field limiting frame that encloses a light-path opening and means for guiding the strip-shaped light-sensitive material behind the image field limiting frame and the light path opening. The mechanism further includes a transport arrangement for the forward transport of the strip-shaped material in its longitudinal direction and at least one mask that can be brought into and out of use for the purpose of covering portions of the light-path opening thereby forming a smaller picture window. The portions of the light-path opening coverable by the mask adjoin the edges of the light-path opening that are at right angles to the longitudinal direction of the strip-shaped material. Thus, through displacement of the mask, the first edge of the image window seen in the forward transport direction of the strip-shaped material, as well as the second edge of the image window, are changable in their position. The mechanism also includes control means for the automatic limitation of the forward transport steps for the strip-shaped material by the transport arrangement which is proportional to the picture window left open by the mask.

Known mechanisms of the above mentioned type are each arranged as integratable parts of a photographic camera and enable, with one and the same camera, to make photographic exposures with two different picture formats. In such cameras, the choice of the desired picture format must be made each time prior to the introduction of the strip-shaped light-sensitive material and can then no longer be changed. Coincidental with the choice of the picture format, the transport arrangement must be switched or partially exchanged each time in order to adapt the transport step of the light-sensitive material that is required after each exposure to the selected picture format. In the simplest case, a mask is introduced in the view area limiting frame that reduces the view window, or the mask must be removed, and the transport steps of the strip-shaped material must be manually executed and measured by means of numbers of two different number series printed on the back of the material which are visible through two alternatively exposable indicator windows. In the viewer of the camera, fields corresponding to the two picture formats are simultaneously visible which therefore does not exclude mistakes.

For universal cameras, interchangable film cassettes with different sized picture windows are also known. Each film cassette has its own transport arrangement for the film with a constant transport step corresponding to the fixed picture window of the cassette. If at least two such cassettes with different picture windows are available, the picture format can be selected for each exposure corresponding to the given possibilities by exchanging the cassettes. This solution results in a relatively great material expenditure.

Also known are microfilm exposure instruments in which the size of the picture window is changeable in the longitudinal direction of the light-sensitive strip-shaped material and the transport step of the transport arrangement is automatically adapted to the set picture window size. In these known instruments, for the purpose of avoiding the overlapping of sequential photographic pictures, it is a necessity in each case to first change the size of the picture window and then subsequently to transport the strip-shaped material forward to exposure location except in the case where the second edge of the picture opening, seen in the forward transport direction of the strip-shaped material, has an unchanged position. In many applications, the latter is, however, detrimental since when the size of the picture window is changed, the center of the window is displaced coincidentally in relation to the optical axis of the objective. Such a displacement may be tolerable in the microfilm exposure of documents, but is generally not acceptable in a camera for general photography purposes.

SUMMARY OF THE INVENTION

It is therefore an object of the present invention to provide a mechanism of the type initially stated which enables more convenient handling and largely eliminates mis-manipulation with corresponding loss of light-sensitive material.

To achieve this object, it is proposed in the originally mentioned mechanism according to the invention that means for the adjustment of the mask are also connected to the transport arrangement for the strip-shaped material so that every location displacement taking place in the forward transport direction by the second edge of the picture window is automatically followed by at least an equivalent forward correction transport of the strip-shaped material. In this manner, it is possible to execute picture window changes at any time, even after operation of the transport arrangement for the strip-shaped material, without a danger of overlapping of sequential pictures existing.

In a preferred form of the mechanism, the transport arrangement can additionally be designed for the backward transport of the strip-shaped material so that every position change counter to the forward transport arrangement of the strip-shaped material by the second edge of the picture window is followed automatically by a maximum equal backward correction of the strip-shaped material. In this manner, a potential loss of light-sensitive material between subsequent pictures is avoided.

Appropriately, the mechanism may include two masks, e.g. executed as sliders, that are each capable of covering a portion of the light-path opening from the direction of the opposite edges of the longitudinal direction of the transport direction of the strip-shaped material. It will be useful to forcibly supply both masks with opposite equal movements so that the picture window remaining open between the masks remains symmetrical with respect to a central bisector of the light-path opening when the picture format is changed. It is also possible to make the two masks movable independently from each other or in a positive manner so that the picture window defined by the masks can be brought into a decentric or eccentric position, e.g. in order to avoid tilting lines on the photographic image.

The mechanism according to the invention can, advantageously, be camera-independent and have the shape of a usual film roll cassette for the removable attachment to the back of a photographic camera. In this situation, the mechanism is appropriately completely closed by the mask or masks which then serve as light protective slides in order to protect the light-sensitive material from light incidence when the mechanism is removed from the camera.

According to a further embodiment of the invention, a mechanism of the type initially mentioned is provided with an indicator field with optically visible models of the light-path opening and the mask as well as means for controlling the model of the mask analog to the mask position in order to provide a visual indication of the respective mask position or picture window adjustment with respect to the contours of the light-path opening. In this manner, the photographer can, at any time, quickly and unambiguously recognize the present picture window adjustment or mask position. Also, analog to the indicated field, a viewer for viewing the photographic motif may be provided which enables the mechanism to be used on other cameras than ground glass plate cameras.

Preferably, the masks are capable of being placed into various positions so that several different picture formats can be selected. In a preferred form of the mechanism of this invention, the light-path opening of the image-field limiting frame has the measurements of 12×6 cm, whereby, by means of the masks, the picture window can be selectively adjusted to the further formats of 9×6 cm, 7.2×6 cm, 6×6 cm and 4.5×6 cm. Thus, a total of five different picture formats are possible.

Furthermore, the mechanism can be equipped with a running measuring tape or the like that is transported analog to the strip-shaped light-sensitive material and which carries readable data concerning consumption of the still available supply of the strip-shaped material on an indicator field. This measuring tape can be divided into two or more parallel running tracks that are assigned to light-sensitive strips of different lengths and a movable curtain or the like can be arranged for the indicator field which covers the portion of the measuring tape that is presently not needed in order to avoid errors. Additionally, the measuring tape can carry control information, e.g. in the form of cams, in order to carry out certain control functions, especially for signalling the starting position of the strip-shaped material for the first photographic exposure and/or for the actuation of an e.g. acoustic signaller that produces a signal to indicate that only certain predetermined remaining lengths of the strip-shaped material are available for further exposures.

Further characteristics, specifics and advantages of the present invention will become evident from a consideration of the claims, the following explanatory description and the attendant drawings which, solely for the sake of example, present specific embodiments of the subject invention.

DESCRIPTION OF THE DRAWING

In the drawing,

FIG. 1 is a side view of one embodiment of a device according to the present invention which may be attached to the back of a ground glass camera in a manner similar to that of a conventional negative cassette;

FIG. 2 is an analog view towards the opposite side of the device of FIG. 1;

FIG. 3 shows the device of FIG. 1 in view of its front side;

FIG. 4 represents a back view of the device of FIG. 1;

FIG. 7 is an enlarged scale, cross-section view according to line 7—7 of FIG. 1;

FIG. 9 shows a partial longitudinal section according to line 9—9 of FIGS. 4 or 7 in an enlarged scale in comparison to FIG. 4;

DETAILED DESCRIPTION OF THE PREFERRED EMBODIMENTS

Figure 5A:
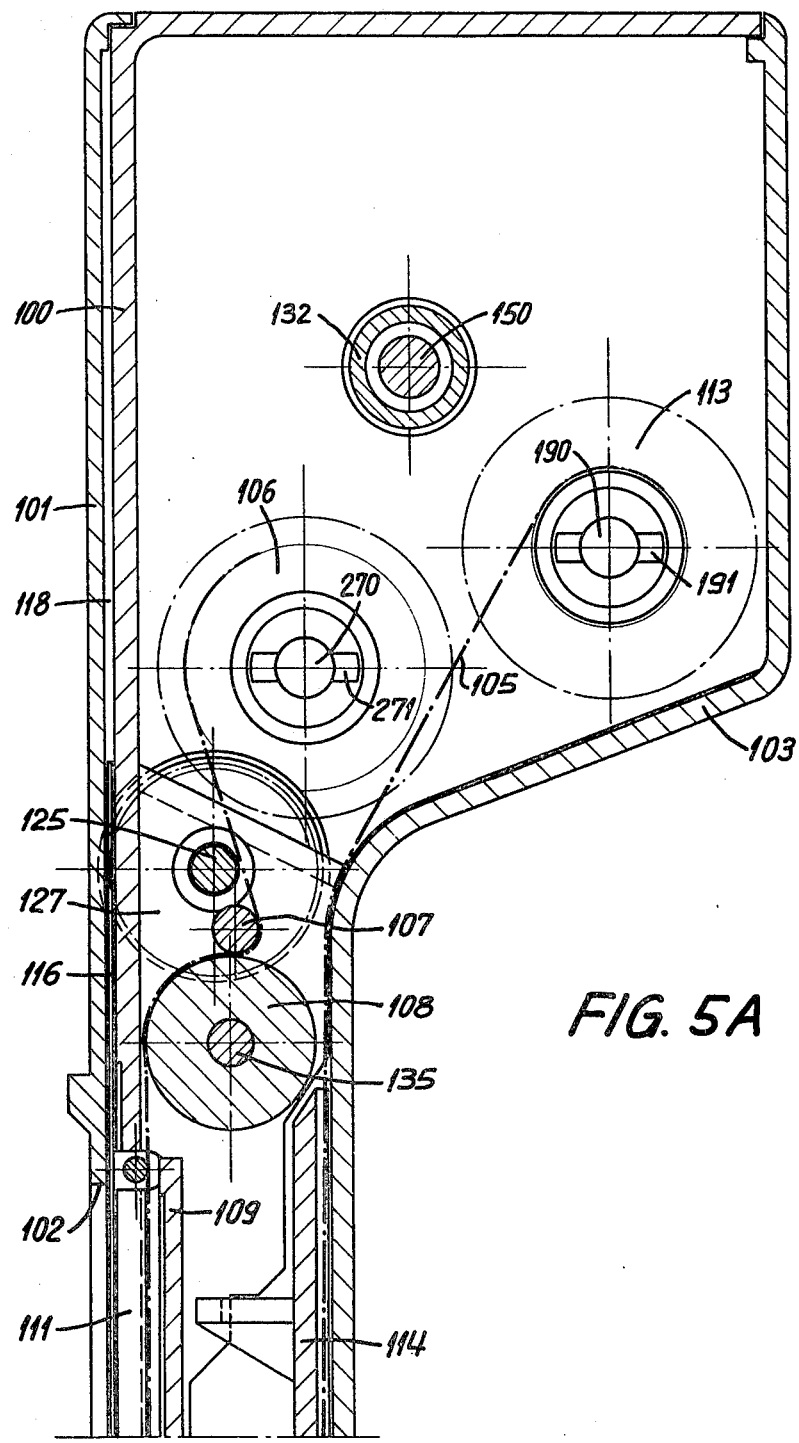
FIGS. 5A and 5B each show an enlarged scale, partial longitudinal section view according to line 5—5 of FIGS. 3 or 4.

The embodiment of the device according to the invention as shown in FIGS. 1 to 13 includes a light-tight housing 100 which is removably attachable like a conventional cassette for photographic exposure material on the rear portion of a ground-glass camera of known construction. Solidly attached to the front side of the housing 100 is a frame 101 (FIGS. 3, 5A and 5B) that encloses a rectangular shaped light-path opening 102 which defines the largest format of photographic images that can be produced with the device. The reverse of the housing 100 is partially designed as a flip-open lid 103 (FIG. 4) that is able to be opened by means of hinge 104.

In the interior of the housing 100 are found the subsequently described means for guiding and holding a strip-shaped, light-sensitive material 105, in the present example, a film roll. According to FIGS. 5A and 5B, the as yet unexposed film 105 is spooled in known manner on a roll-off spool 106 from which the film passes through a guide roller 107 and a measuring roller 108 to a film stage or film depression plate 109 behind the opening 102. The film stage 109 is under the influence of spring 110 which presses the film stage and, therefore, presses the film 105 against film guide runners 111 in order to maintain the plane of the film within the range of the opening 102. The guide runners 111 are located along the longitudinal edges of the frame 101, outside of the opening 102. After crossing the film stage 109, the film 105 reaches a further guide roller 112, after which the film passes along the inside of cover 103 to take-up spool 113 located in the vicinity of the roll-off spool 106. The film stage 109, the spring 110 and carrier 114 which supports the latter together form a film tension device that appropriately can be removed when the lid 103 is open in order to facilitate introduction of the film.

Figure 5B:
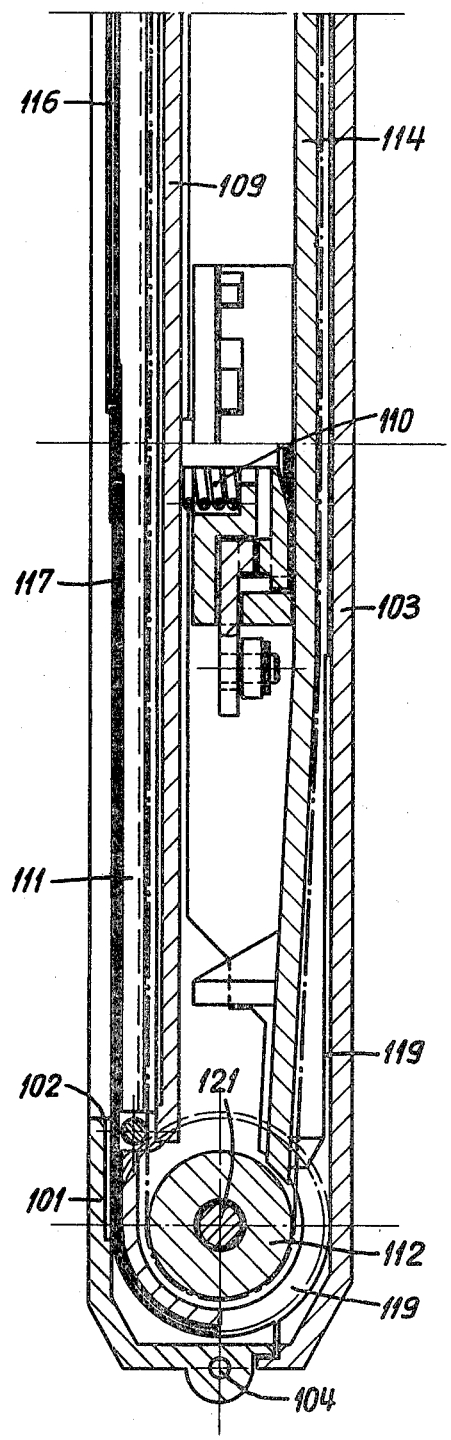
Figure 8:
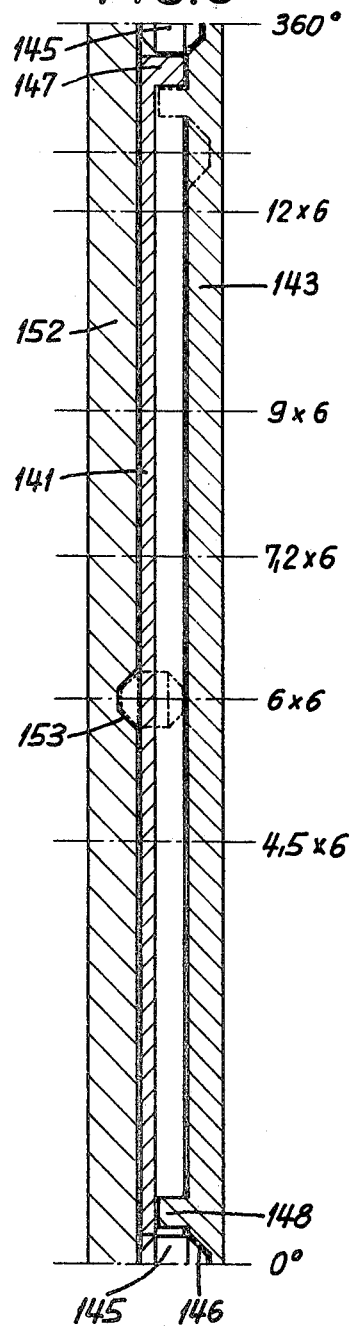
FIG. 8 is a schematic developmental presentation of a circumferential section carried over 360° through some of the portions of the device shown in FIG. 7.

As is also shown by FIGS. 5A and 5B, located directly behind frame 101 and in front of the film 105 are two movable masks 116 and 117 of a foil-like light-proof material, such as e.g. steel sheet, the masks being dimensioned such that they can each cover one-half of the opening 102. One of the masks 116 is held in a pair of grooves 118 located opposite to each other, the grooves permitting the mask 116 to slide completely from the range of the opening 102. In similar manner, the other mask 117 is guided in a pair of opposing grooves 119 that also permit the mask 117 to slide completely from the range of the opening 102. While the grooves 118 for mask 116 take a straight-line course, grooves 119 for the other mask 117 each have a U-shaped bent course around the guide roller 112 and partially along the back side of the housing 100, i.e. along the cover 103. The grooves 118 and 119 for guiding the masks 116 and 117 run essentially parallel to the longitudinal direction of film 105.

Figure 6:
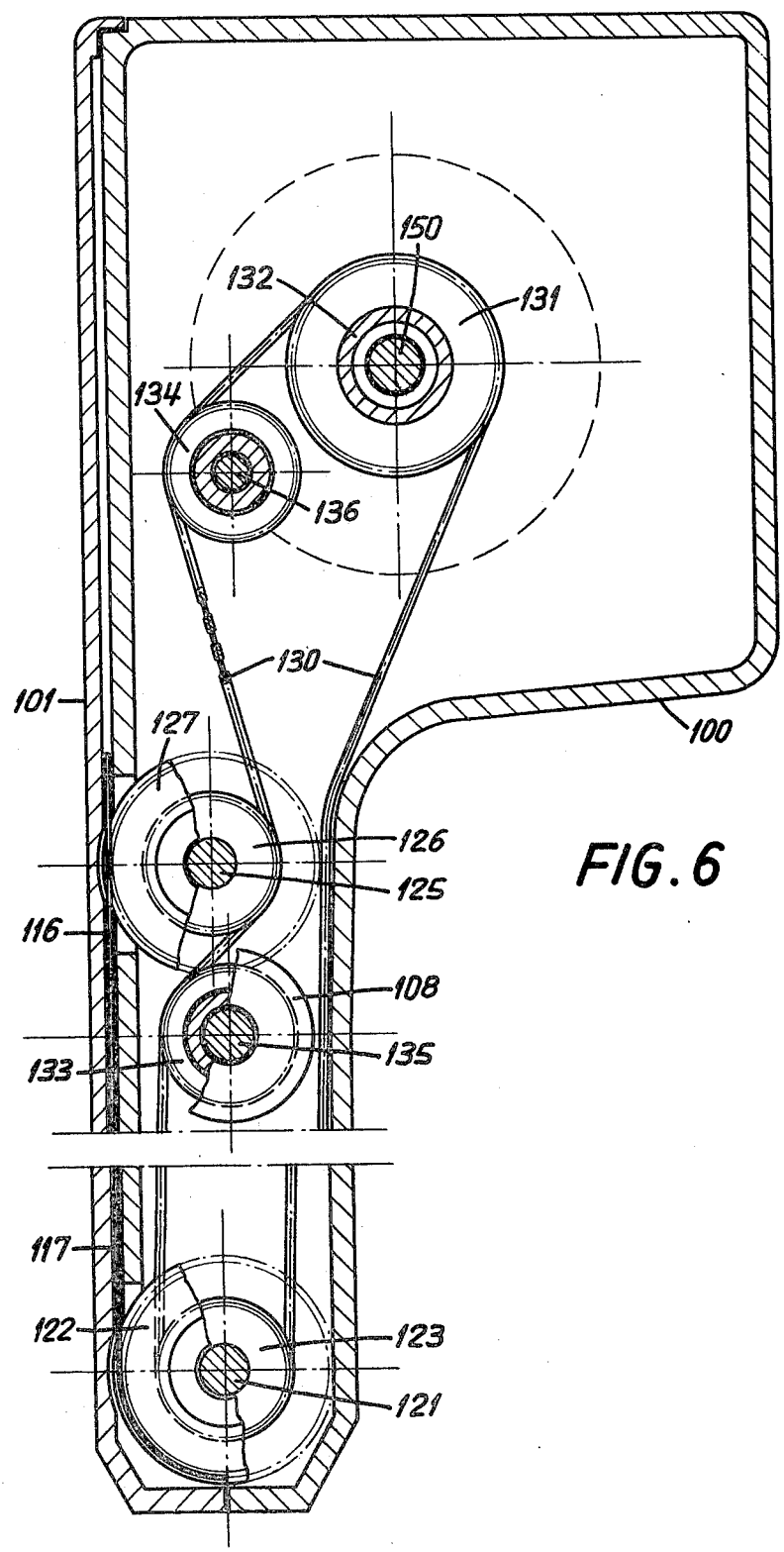
FIG. 6 shows an analog, enlarged scale, longitudinal section view according to line 6—6 of FIG. 3.

The previously mentioned guide roller 112 is mounted freely revolvable on shaft 121 which is mounted freely revolvable in housing 100. As is shown in FIG. 6, both ends of shaft 121 carry toothed discs 122, only one of which is visible in FIG. 6. The discs 122, together with tooth-belt wheel 123 are solidly attached to shaft 121. The teeth on the circumference of the discs 122 enter into two rows of perforations that are located along the longitudinal edges of the mask 117. Thus by turning the tooth-belt wheel 123 of the shaft 121 and the toothed disc 122, the mask 117 can be moved along the guide grooves 119. In an analogous manner, mask 116 is moved by a shaft 125 rotatably mounted in housing 100, a tooth-belt wheel 126 and two discs 127 that are toothed on their circumference being attached to the shaft. The teeth of the discs 127 engage two rows of perforations that are located along the longitudinal edges of mask 116. The perforations of both masks 116 and 117 are located outside of opening 102 and are covered by frame 101.

A two-sided, toothed endless drive belt 130 passes over the two tooth-belt wheels 123 and 126 in such a manner that the outside of the belt engages the belt wheel 126 and the inside of the belt engages the belt wheel 123. Thus, the two toothed pairs of discs 127 and 122 are driven by belt 130 each in opposite directions. The drive of the belt 130 takes place by a tooth belt wheel 131 that is fixedly mounted on a hollow shaft 132 that is rotatably mounted in housing 100 and which can be operated from outside as will be described further below. In order to gain a larger circumferential contact of the belt 130 with the tooth belt wheel 126, the belt 130 additionally passes over two further tooth belt wheels 133 and 134, the first of which is arranged equal-axially with the already mentioned measuring roller 108 and is mounted freely turnable on the shaft that carries the roller. The other additional tooth belt wheel 134 is freely turnable and is mounted on a shaft 136 fastened in housing 100. By turning the hollow shaft 132 in one direction, e.g. in FIG. 6 in a counter clockwise direction, the two masks 116 and 117 can be moved away from each other by means of the tooth belt wheels 131, 126 and 123 and by means of the tooth belt 130, so that the masks will clear the opening 102 either completely or partially. By turning the hollow shaft 132 in the opposite direction, the two masks 116 and 117 can be moved towards each other in order to cover opening 102 completely or partially. Thus it is possible to selectively cover the opening 102 completely in order to protect the film against incident light, or, for a photographic exposure, to form a picture window between masks 116 and 117 whose size and format are changable within the limits determined by opening 102. If the opening 102, for example, has the dimensions of 12×6 cm, the appropriate setting of the masks 116 and 117 can, in addition to the picture format of 6×12 cm, adjust to the usual picture formats of 9×6 cm, 7.2×6 cm, 6×6 cm and 4.5×6 cm.

As is shown in FIG. 7, one end of the hollow shaft 132 that carries the tooth wheel 131 and driving belt 130 extends from housing 100 and has an end-flange 140 which is solidly connected to a circular ringshaped control disc 141. The end-flange 140 and the control disc 141 are contained on the inside of a pot-shaped turning knob 143 which is outside of housing 100 and rotatably mounted on the hollow shaft 132. The control disc 141 has an eccentrically arranged interruption 144 into which a control cam 145 is fitted. The control cam 145 is slidably mounted in the interruption 144 parallel to the axis of the hollow shaft 132. The control cam 145 is formed such that it extends either on the one side or on the opposite side of the control disc 141 whereby the extending portion has the form of a conical stump in either position. The inner surface of the turning knob 143 has a conical stump recess 146 with which the control cam 145 can enter in order to couple the turning knob with the control disc 141 and therefore with the hollow shaft 132 for rotation. If the latter is the case, the masks 116 and 117 can be moved by turning the knob 143 in order to selectively open or close opening 102. The two flat surfaces of the control disc 141 and the turning knob 143 that face each other are spaced a distance from each other and are each provided with a projection 147 and 148 as can be seen in the despooling drawing of FIG. 8. By the projections 147 and 148 contacting each other, the turnability of the control disc 141 and the turning knob 143 are each limited to somewhat less than 360° when the control cam 145 is removed from the recess 146. However, the projection 148 of the turning knob 143 is also designed to work together with the control cam 145 as will be discussed further-on.

Arranged rotatably and coaxially within the hollow shaft 132 is shaft 150 which extends at both ends from the hollow shaft 132 and the housing 100. One end of the shaft 150 terminates in the interior of the pot-shaped turning knob 143 and carries a circular, ringshaped program disc 152 and a circular scale disc 151 which are both fixedly connected to the shaft 150 and arranged inside the turning knob 143. The program disc 152 is directly adjacent to the control disc 141 and has a truncated cone recess 153 into which the control cam 145 can be inserted in order to couple the program disc 152 with the control disc 141 and, therefore, shaft 150 with the hollow shaft 132 for rotation. Between the program disc 152 and the scale disc 151, a ring disc 154 is located, the outer diameter of which is fixedly connected with the turning knob 143. It can be seen in FIG. 1 that the ring disc 154 carries a reading mark 155 that is assigned to a scale 156 on the scale disc 151 of the adjustable picture formats that can be arranged by means of masks 116 and 117. The circumference of the turning knob 143 has an indicator 157 whose angular position agrees with that of the reading mark 155. In can also be seen in FIG. 1 that two markings 158 and 159 are provided on the outer surface of housing 100 which, in conjunction with the indicator 157, permit the recognition whether masks 116 and 117 are in the open or closed position.

The end portion of shaft 150 opposed from knob 143 carries a second turning knob 160 which is fixedly attached to shaft 150 on the exterior of housing 100 in order to facilitate the rotation of the shaft for the purpose of changing the format of the picture window opened by masks 116 and 117. The turning knob 160 has several cone-shaped recesses 161, only one of which is visible in FIG. 7. A guide shell 162 attached to housing 100 is provided for bolt 163 which, under the influence of spring 164, brings the conical end of the bolt 163 into engagement with one of the recesses 161 such that each time when the knob 160 is turned, a recess is brought into an axially arranged position with respect to bolt 163. In the described and illustrated embodiment, a total of five engagement recesses 161 are provided, one being assigned to each of the formats of 12×6 cm, 9×6 cm, 7.2×6 cm, 6×6 cm and 4.5×6 cm of the picture window. Knob 160 carries a scale disc on its exterior surface 165 on which scale 166 is attached to signal the above-mentioned formats. On the outer surface of housing 100 as is shown in FIG. 2, a reading mark 167 that is assigned to scale 166 is provided.

The first-mentioned turning knob 143 provides for the movement of both masks 116 and 117 into a position completely closing opening 102 or from a closed position into an open position in which a picture window of selected format is established between the masks 116 and 117. The second turning knob 160 provides for the preselection of the format of the picture window and thus the picture format of a subsequent photographic exposure. If, at any one of the engaged positions of the format selection knob 160, the mask control knob 143 in FIG. 1 is turned in a counter-clockwise manner from the indicated "Closed" position to the "Open" position, then, initially and by means of the control cam 145, the turning moment is transferred from the knob 143 to the control disc 141 and, thus, to the hollow shaft 132 since the control cam 145 is engaged with the recess 146 of knob 143 and is prevented by the program disc 152 from escaping from the recess 146 of knob 143. In this manner, the two masks 116 and 117 are moved from their closed position into an open position. While this movement is taking place, the format selection knob 160, the shaft 150 and the program disc 152 remain stationary. As soon as the control cam 145 reaches a position that is in alignment with the recess 153 of the control disc 152, the cam escapes into the mentioned recess 153 due to an axial pushing force exerted on the control cam by means of the conical surface of recess 146 of turning knob 143. Thus when the control cam 145 reaches engagement with the recess 153 of the program disc 152, it moves out of recess 146 of knob 143 and the coupling between knob 143 and the control disc 141 is disengaged. From this moment on, the knob 143 can be turned alone into the "Open" position while the control disc 141 is coupled with the standing program disc 152 by means of the control cam 145 and the masks 116 and 117 therefore cannot be opened further. The picture window that is opened between masks 116 and 117 now has the desired format that can be optionally read on scale 166 with reference to reading mark 167 or on scale 156 with reference to reading mark 157.

Upon turning the knob 143 in the opposite direction, the control disc 141 and the hollow shaft 132 initially remain at rest until the recess 146 of the knob 143 reaches a corresponding position with the control cam 145 which is engaged with recess 153 of the program disc 152. Consequently, the driver cam 148 of knob 143 contacts the control cam 145 on the side. The sideways pressure that is exerted on the control cam 145 in this manner results in an axial pushing force on the control cam so that the cam escapes from the recess 153 of program disc 152 and becomes engaged with the recess 146 of the knob 143. In this manner, control disc 141 is coupled with knob 143 and decoupled from program disc 152. Upon further turning of knob 143 into the "Closed" position, the hollow shaft 132 is turned and masks 116 and 117 are moved into their "Closed" position whereby the adjusted format size remains programmed for a renewed opening of the masks.

If the format selection knob 160 is turned into a different engagement position while the mask control knob 143 is in the "Open" position, shaft 150 will turn and thus the program disc 152. Since the control cam 145 is engaged within recess 153 of the program disc 152 and cannot escape, the program disc is coupled with control disc 141 so that the hollow shaft 132 is also turned and masks 116 and 117 are adjusted to the newly selected format of the picture window.

Located on the back side of housing 100 in FIG. 4 is an indicator window 170 in which the corresponding position or masks 116 and 117 is visually displayed on a reduced scale. The means provided for this purpose are shown in FIGS. 7 and 9. The indicator window 170 shows a transparent protective glass 171, e.g. of plastic. Located behind the protective window are two index slides 172 and 173 which are reduced models of the two masks 116 and 117 and which preferably consist of a transparent, colored material. Index slide 172 is provided with two parallel extending lips 174, each of which is connected by means of a joint 175 with the fork-like end of lever 176. The other also fork-shaped end of lever 176 is movably attached by means of joints 177 to housing 100. In the middle between two joints 175 and 177, lever 176 has a nose 178 which works together with a curved disc 179 attached to hollow shaft 132. In an analogous manner, the other index slide 173 is provided with two extending lips 180 which are connected with the end portion of lever 182 by means of joint 181. The other end of this lever 182 is movably attached to housing 100 by means of joint 183. In the middle between the two joints 181 and 183, lever 182 has a nose 184 which works together with a second curved disc 185 that is fixedly attached to hollow shaft 152. The two curved discs 179 and 185 each have a spiral shaped circumferential surface against which the nose 178 and 184 rests, the mentioned spirals rising in opposite directions. A pull-spring 186 is attached between lever 176 and lever 182 so that the levers are pulled towards each other and their noses 178 and 184 are held in contact with the circumferential surfaces of the curved discs 179 and 185. The entire arrangement is of such a nature that the position of the two index slides 172 and 173 with respect to each other is always analogous to the position of the two masks 116 and 117. Thus, the index slides 172 and 173 always directly adjoin each other when masks 116 and 117 are in the closed position and completely cover opening 102. Conversely, the edges of the index slides 172 and 173 that face each other are positioned precisely at the opposing edges of the indicator window 170 when masks 116 and 117 are fully open and opening 102 is completely open. From the position of the index slides 172 and 173 in the indicator window 170, the position masks 116 and 117 occupy in relation to opening 102 is indicated.

Figure 13:
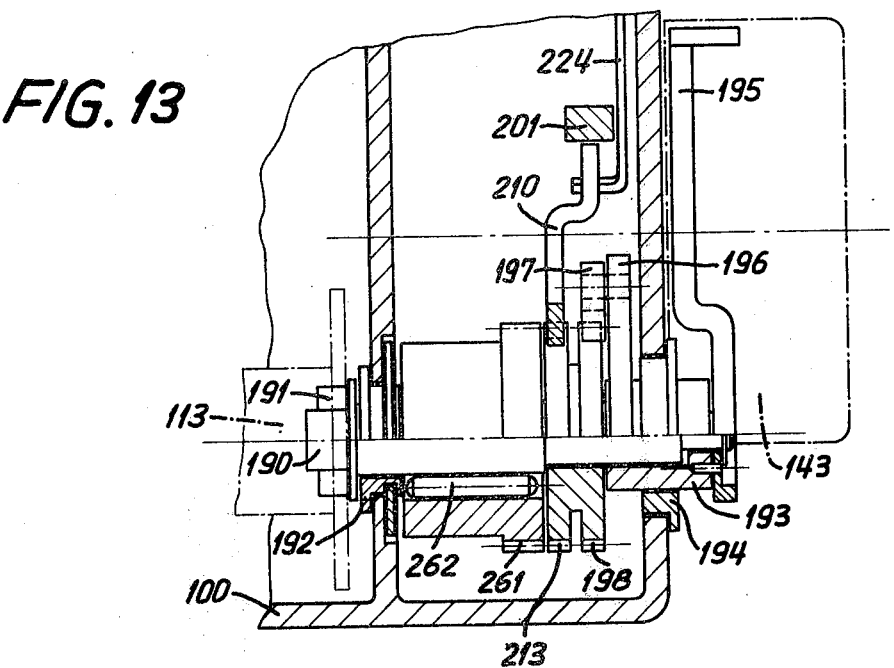
FIG. 13 is an enlarged scale, partial cross-section view according to line 13—13 of FIG. 2.

The following means are provided for the forward transport of film 105 from the run-off spool 106 to the take-up spool 113. A shaft stub 190 extends into one axial end of the take-up spool 113, the stub being provided in known manner with radial driver wings 191 as shown in FIG. 13. One end of the shaft stub 190 is held in a bearing ring 192 fastened to housing 100 and the other end rotatably carried in a cylindrical shell 193 which is rotatably supported in a bearing ring 194 fastened to the housing. One of the ends of shell 193 extends outside housing 100 and there carries a hand-actuated transport lever 195 which can be seen in FIGS. 2, 3 and 4. Inside the housing, the shell 193 carries an arm 196 on which a handle 197 is movably attached. The handle 197 works together with the toothed circumference of ratchet wheel 198 fixedly attached to the shaft stub 190. If the transport lever 195 is actuated (in FIG. 2, counter clockwise), arm 196 also carries out a corresponding movement and the handle 197 thereby engages into the teeth of the ratchet wheel 198 and turns it along so that the shaft stub 190 and the take-up spool are correspondingly turned. On the return travel of the transport level 195 in the reverse sense, the handle 197 slides ineffectively over the teeth of the ratchet wheel 198 which, therefore, remains stationary. This return motion of the transport lever 195 can take place automatically under the influence of a spring (not shown).

Figure 11:
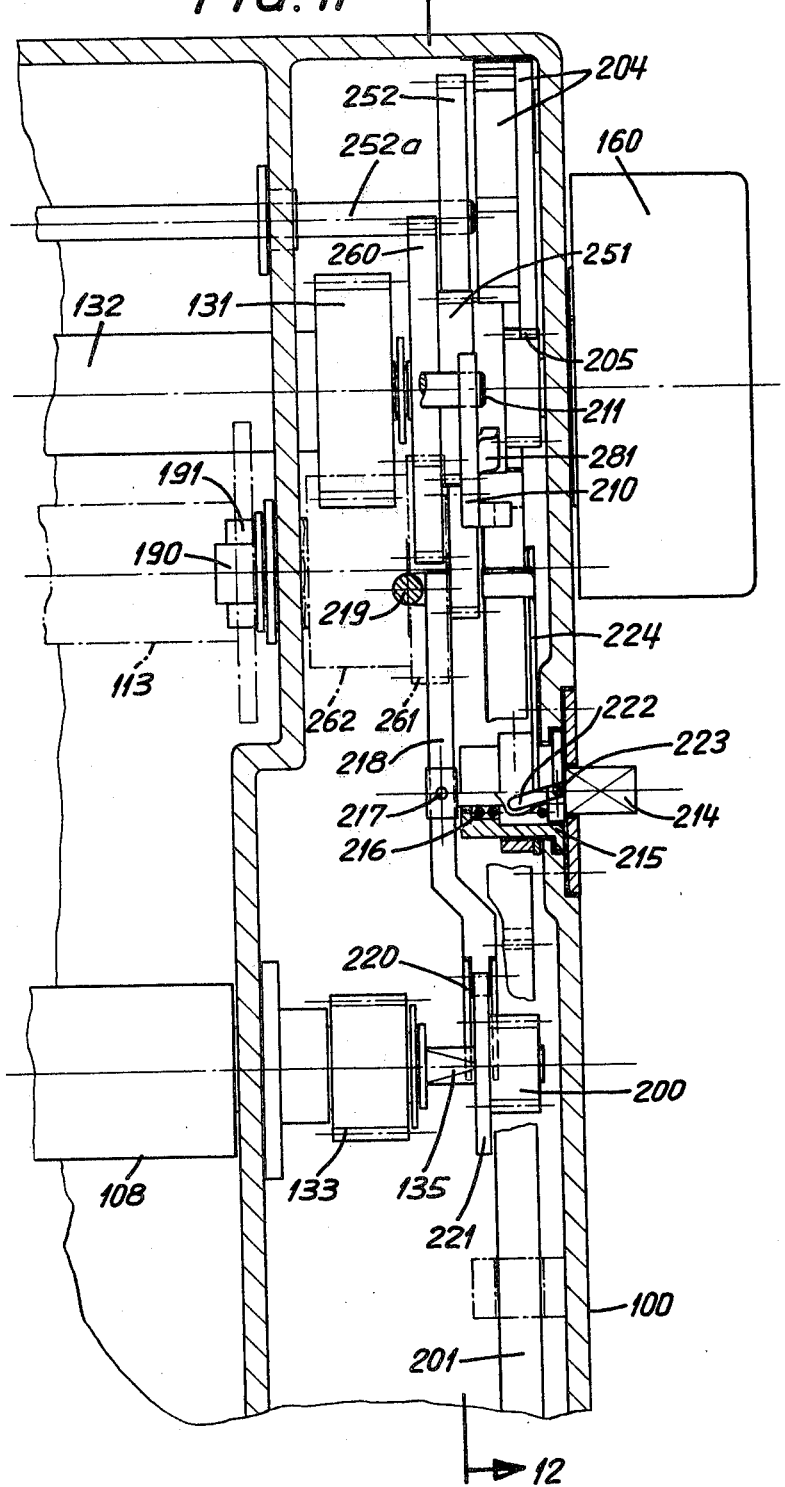
FIG. 11 is a partial, enlarged scale, longitudinal section view according to line 11—11 of FIG. 2.
Figure 12:
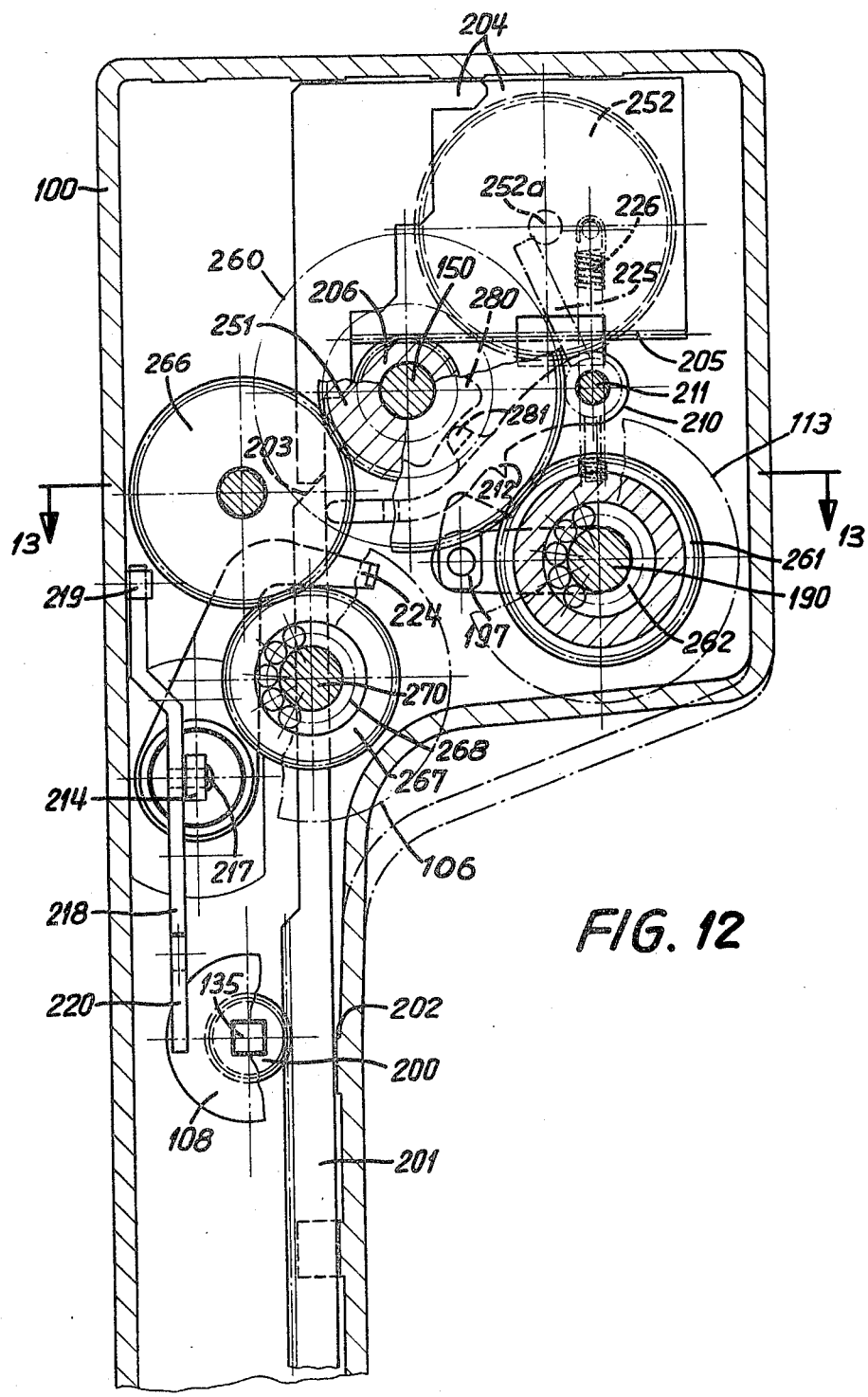
FIG. 12 shows an enlarged scale, longitudinal section view according to line 12—12 of FIG. 4.

The transport steps of the film are correspondingly limited to each adjusted format of the picture window. For this purpose, the already mentioned measuring roller 108 is connected for rotation by way of shaft 135 with a toothwheel pinion 200, the pinion engaged with a toothed rod 201 as can be seen in FIGS. 11 and 12. The toothed rod 201 is guided movably in a longitudinal direction of housing 100. Additionally, however, the toothed rod 201 is also slightly rotatable about a point 202 that is located in the vicinity of the toothed wheel pinion 200. One end of the toothed rod 201 is provided with a slanted surface 203 which works together with step segment 204 so that the toothed rod experiences a slight swivel upon contact of its slanted surface 203 with the step segment 204. The step segment 204 is also guided movably in housing 100 but in a direction that is perpendicular to the displacement direction of the toothed rod 201. A row of teeth 205 is provided on stop segment 204 in its displacement direction, the row engaged with a toothed wheel pinion 206 which is fixedly attached to shaft 150. Thus by turning the format selection knob 160 for changing of the format of the picture window to be set by masks 116 and 117, the step segment 204 also changes its position. The shape of the step segment 204 is such that, depending on the adjusted picture format, the slanted surfaces 203 of the toothed rod 201 will run up on the step segment sooner or later and thus cause the rotation of the toothed rod 201.

Upon rotation of the toothed rod 201, the rod will press upon a locking lever 210 which is rotatably fastened by means of shaft 211 and which has a locking nose 212. By turning the locking lever 210, the nose 212 can be brought into engagement with locking wheel 213 that is toothed about its circumference. The locking wheel 213 is fastened, together with the ratchet wheel 198, to shaft 190 whereby the transport of the film 105 is stopped and inhibited (FIG. 13).

For the release of the described transport lock, a push button 214 (FIGS. 2 and 11) is provided on the outside of housing 100, the button having the shape of a pin with a square or rectangular cross-section which is capable of being moved in longitudinal direction but is incapable of rotating. As is shown in FIG. 11, the push button 214 is, on the interior of the housing 100, surrounded by a turnable shell 215 which is secured against axial displacement and which contains a spring 216 forcing the push button 214 outwardly. The interior end of the push button 214 is connected by means of a joint 217 to lever 218, the end of the lever being movably connected to housing 100 by means of a joint 219. The other end of lever 218 has a fork 220 in which a flange disc 221 of the previously mentioned tooth wheel ratchet 200 is engaged. Disc 221 and pinion 200 together form a unit that is axially displacable in the shaft 135 of measuring roller 108 but incapable of turning. By pressing the push button 214 contrary to the influence of spring 216, lever 218 can be turned by means of the flange disc 221 such that its fork 220 pushes the tooth wheel pinion 200 in axial direction beyond the range of toothed rod 201. This movement permits the toothed rod 201, under the influence of a return spring (not shown), to return to its original position. Upon release of push button 214, spring 216 returns the tooth wheel pinion 200 back into engagement with the toothed rod 201.

The rotatable shell 215 that surrounds the push button 214 is provided with a sloping groove 222 into which a cross bolt 223 of the push button 214 extends. Located on the shell 215 is an arm 224 whose free end is adapted to work together with the free end of the locking lever 210 in order to push locking nose 212 of the locking lever from the teeth of the locking wheel 213. Upon pushing the push button 214 against the influence of spring 216, the cross bolt 223 slides along the sloping groove 222 of shell 215 thereby turning the shell slightly. This turning of shell 215 results in a movement of arm 224 which activates the locking lever 210 and moves the nose 212 of the lever from engagement with the locking wheel 213. Upon release of the push button 214, the button is pushed outwardly under the influence of spring 216 and shell 215 is turned back and arm 224 is moved back by means of the cross bolt 223 and the groove 222.

Located on shaft 211 that carries the locking lever 210 is an angular feeler arm 225 (FIGS. 7, 9 and 12) whose purpose is explained hereinafter. Added to the structural unit consisting of the locking lever 210, shaft 211 and the feeler arm 225 is a tilt spring 226 which attempts to rotate the mentioned structural unit about the axis of shaft 211 after the unit has been moved in some manner beyond an instable dead point position.

For the visual indication of the film transport in the indicator window 170, an endless measuring tape 230 is provided which, in accordance with FIG. 9, passes over a drive roller 231 and three guide rollers 232, 233 and 234 and, in the process, is led through the range of the indicator window 170 behind the index slides 172 and 173. The guide rollers 232, 233 and 234 are freely rotatable and attached to housing 100. The drive roller 231 is rotatably attached to housing 100 by shaft 235 and is connected for rotation with an equiaxially arranged tooth gear 236 which in turn is engaged with tooth gear 237 by means of a tooth gear 236a. Tooth gear 237 is connected in a slip-free manner with an equiaxially arranged tooth gear 238, the two tooth gears 237 and 238 being arranged in a freely rotatable manner on the previously mentioned shaft 125. The tooth gear 238 is engaged with a further tooth gear 239 equiaxially located with the previously mentioned measuring roller 108 and connected to it for rotation. The mechanism that comprises the tooth gears 236 to 239 is located sideways, outside of the course of movement of film 105, but inside the housing 100. Upon transporting the film 105, the measuring roller 108 is driven directly by the film and the turning motion of the measuring roller is transferred by means of tooth gears 239, 238, 237, 236a and 236 to the drive roller 231 of the measuring tape 230. Consequently, the measuring tape 230 is always moved in an analogous manner to the transport of film 105.

Since conventional film rolls are commercially available with the same width but different lengths such as e.g., the 6.5 cm wide films that are known under the designations "120" and "220", the measuring tape 230 is divided into at least two parallel running tracks having scales containing numeric information concerning the length measurements of the forerunning and following ends of the film. Portions of these scales and numeric information are visible through the indicator window 170. In order to avoid errors, the measuring tape track that is not required for a specific film may be covered over by means of a curtain 240 as is shown in FIG. 7. Curtain 240 is part of a plate 241 having a cutout 242 which allows the measuring tape to be seen. Plate 241 is movably located directly behind the indicator window 170, perpendicular to the longitudinal direction of measuring tape 230. Plate 241 has a lip 243 located towards the interior and connected to one end of a shell 244, the shell being movably arranged on a guide rail 245 fastened to housing 100. As is shown in FIG. 9, the shell 244 carries a two-armed lever 246, one arm of which rests against the interior, back portion of measuring tape 230 and the other arm of which carries a vibration strip 247 of spring material. The vibration strip 247 serves as an acoustical signaller similar to a tuning fork or a musical string.

Figure 10:
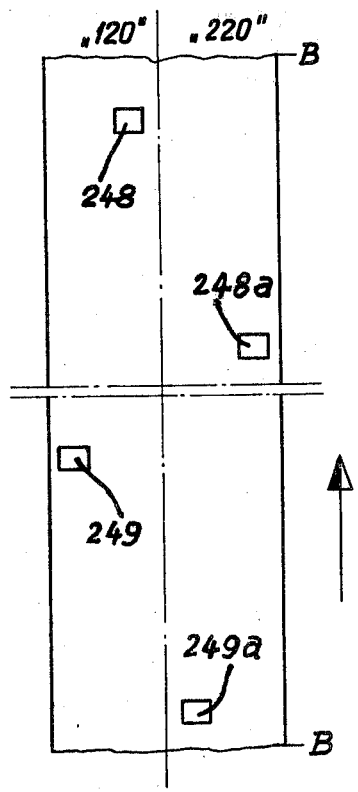
FIG. 10 is a partial view of the unrolling of the measuring tape visible in FIGS. 7 and 9.

As is shown in FIGS. 9 and 10, the measuring tape 230 is provided on its exterior side with four protruding cams 248, 248a, 249 and 249a representing control information which are found at various locations along the measuring tape and are displaced in respect to each other in the crosswire direction of the tape. On the side of the index slide 172 that faces towards the measuring tape 230, two cams 250 are arranged with a sideways distance from each other, only one of which is visible in FIG. 9. These cams 250 are located such that one of them can work together with the cam 249 of measuring tape 230 and the other can work with cam 249a of the measuring tape. Both the measuring tape cams 249 and 249a as well as the index slide cams 250 have the profile of a sawtooth with a gradually rising ramp and a perpendicularly descending hind-flank. If one of the cams 249 and 249a of the measuring tape runs past the corresponding index slide cam 250, the corresponding section of the measuring tape 230 is somewhat forced towards the inside, thereby causing lever 246 to be actuated and the vibration strip 247 to be tensed. The moment the measuring tape cam 249 or 249a, after passing over the corresponding index slide cam 250, slides off from the index slide cam, lever 246 and vibration strip 247 are suddenly released resulting in the vibration strip being set into vibration and thereby producing an audible sound as an acoustical signal.

FIGS. 11 and 12 show that shaft 150, which carries the knob 160 required for format selection, also includes a toothgear 251 fixedly connected to the shaft which engages a further toothgear 252. The toothgear 252 is fixedly mounted to shaft 252a that is rotatably arranged in housing 100. On the opposite end of shaft 252a, a toothgear 253 is fixedly fastened which, according to FIG. 9, engages a further toothgear 254. This toothgear 254 is rotatably fastened by means of a shaft 254a in housing 100 and is engaged with a straight running tooth series 255a on the control slide 255. Control slide 255 is straight-line adjustable along measuring tape 230 in a guide-recess 256 of housing 100 and has two sideways displaced control cams 257, only one of which is visible in FIG. 9, on the side that faces towards the measuring tape 230. The arrangement of the control cams 257 is such that one of the cams can work together with the previously mentioned cam 248 of the measuring tape 230 and the other can work with cam 248a of the measuring tape.

On the interior side of measuring tape 230 is, as is shown in FIG. 9, a two-armed sensor lever 258 rotatably fastened to housing 100 by means of a shaft 258a. The sensor lever 258 is under the influence of a spring 259 which forces the sensor lever 258 such that one arm rests against the inside of measuring tape 230 and in an area that is juxtaposed to cam 257 of the control slide 255. The other arm of the sensor lever 258 works together with the feeler arm 225 when the sensor lever is rotated against the influence of spring 259. When either of the cams 248 and 248a of measuring tape 230 passes across the corresponding cam 257 of the control slide 255, the corresponding section of the measuring tape is pushed somewhat towards the inside causing the sensor lever 258 to be rotated against the influence of spring 259. This rotation actuates the feeler arm 225 which in turn tilts the connected locking lever 210 into an engagement position with the locking wheel 213.

The measuring tape 230 has a predetermined zero position to which the tape must be brought either manually or automatically by means of spring power before the film roll is inserted into housing 100. In reference to the above-mentioned zero position, each of the measuring tape cams 248 and 248a has a location such that they always pass across the corresponding cam 257 of the control slide 255 when an inserted film roll of the type "120" or "220" has been transported forward such that the forerunning end portion of the film capable of being exposed for the first photographic picture is located within the picture window that has been opened by masks 116 and 117 in dependence on the adjusted picture format, e.g. at point "A" in FIG. 3. The measuring tape cam 249 has a position such that it will always run across the corresponding index slide cam 250 when the following end of a film roll of type "120" has not yet entered the picture window that is held open by masks 116 and 117 and indicates a predetermined, relatively short distance from the picture window. In analogous manner, the measuring tape cam 249 has a location such that it always runs across the corresponding index slide cam 250 when the following end of a roll of type "220" has not yet entered the adjusted picture window and indicates a predetermined, relatively small distance from the picture window.

If, after an executed photographic exposure and the subsequent transport of the film in accordance with the format that was adjusted for that exposure of the picture window opened by masks 116 and 117, the picture format for the next exposure is enlarged, the film must be transported forward somewhat further in order to avoid an overlap of the latent photographic images. A forward correction transport is therefore required. For this purpose, the following means are provided as is shown in FIGS. 7, 12 and 13.

On the shaft 150 which carries knob 160 for the selection of the format is toothgear 260 connected to shaft 150 for rotation. Toothgear 260 engages with another toothgear 261 which is located on the previously mentioned stubs stuf 190 and which, by means of freerun-locking-coupling 262, drives take-up spool 113. The freerun-locking coupling 262 is arranged such that upon rotation of toothgear 261 in a clockwise direction in FIG. 12, the shaft stub 190 is driven and the take-up spool 113 is rotated in the direction for the take-up of film 105. Upon a counter-clockwise rotation of toothgear 261, the coupling 262 is ineffective and the shaft stub 190 is not rotated. The transmission of the drive formed by toothgears 260 and 261 is such that at a predetermined winding diameter below the mean diameter of the take-up spool 113, the adjustment of a larger picture format results in a sufficient forward correction in the transport of the film in the direction from the reserve spool 106 to the takeup spool 113. Thus, an overlapping of subsequent latent photographic images is avoided and a sufficient distance between the pictures is guaranteed.

If the picture window opened by masks 116 and 117 is reduced by a corresponding rotation of knob 160 after a photographic exposure with a larger format has already been made and film 105 has been advanced in accordance with the larger format, a loss of film would occur since an unnecessarily large empty space would occur between the picture with the smaller format and the previously produced picture unless film 105 were transported backwards by a corresponding amount.

The above-mentioned loss of film is avoided or at least reduced to an acceptable minimum by the subject device. For this purpose the following means for backward transport correction of the film are provided as is shown in FIGS. 7, 12 and 13. The previously mentioned tooth gear 251 that is connected to knob 160 providing the selection of the format by means of shaft 150 is further engaged with a tooth gear 266 which, in turn, is engaged with toothgear 267. The toothgear 267 engages freerun-locking coupling 268 located on a shaft stub 270 which is rotatably mounted in housing 100 and which has on one end radial drive wings 271 that reach into the supply spool 106 for film 105 (FIG. 5A). The freerunlocking coupling 268 is designed such that upon rotation of the toothgear 267 in clockwise direction in FIG. 12, the shaft stub 270 is rotated and the supply spool 106 is rotated in the sense to take up the film 105. Upon rotation of the toothgear 267 in the opposite direction, the coupling 268 is ineffective and the shaft stub 270 is not turned. The transmission of the drive that is formed by the toothgears 265, 266 and 267 is such that at a predetermined winding diameter above the mean diameter of spool 106, the adjustment of a smaller picture format results in such a reverse correction of the transport of film 105 in the direction of the supply spool 106 from takeup spool 113 that the sequential photographic pictures follow each other without an excessively large empty space between pictures.

It is evident from the foregoing that upon each change of the format of the picture window opened by masks 116 and 117, a correcting transport of film 105 takes place in a forward or backward direction depending on whether the format is enlarged or reduced. For this reason, a format change is possible only if, prior to the change, the push button 214 has been actuated in order to release the film transport lock, i.e. the nose 212 of the locking lever 210 has been brought out of engagement with the locking wheel 213.

In order to insure that the film transport lock becomes automatically effective after each change of the picture format, the following means are provided which are shown in FIGS. 7 and 12. On shaft 150 that carries knob 160 which serves for the selection of the format is a capstan 280 that is fixedly connected for rotation with the shaft. The capstan 280 works between the two stop positions of knob 160 with cam 281 of the locking lever 210 in order to tilt locking lever 210 in the direction towards the locking wheel 213 (FIG. 13). The nose 212 of the locking lever 210, however, cannot engage the locking wheel 213 as long as the knob 160 is not yet in an intermediate position between the two rest-stops because then the inner end part of bolt 163 reaches into the motion path of locking lever 210 thereby holding it back shortly before it engages locking wheel 213. Only when the outer end of bolt 163 is under the influence of spring 164 and engaging one of the recesses 161 of knob 160 will the inner end part of bolt 163 clear the way for the nose of locking lever 210 to engage the locking wheel 213 and thus lock the film transport.

The use and effectiveness of the described mechanism, as far as not being recognizable from the foregoing description, is briefly summarized as follows;

Prior to the introduction of the film roll, the mask control knob 143 is turned into the "Closed" position whereby the two masks 116 and 117 are moved into the "Closed" position and the light-path opening 102 on the front side of housing 100 is closed light-tight. Then cover 103 is opened and the tension device 109, 110, 114 is removed from housing 100. The supply spool 106 that carries the spooled film roll is made to engage with the shaft stub 270 and its radial drive wings 271. In analogous manner, an empty takeup spool 113 is coupled to shaft stub 190 and its radial drive wings 191. The outer forerunning end of the protective paper of the film roll is pulled off the supply spool 106 by hand and pushed through between rollers 107 and 108, led around the guide roller 112 and pulled forward far enough until the point of the start-arrow which is printed on the protective paper is located even with a specific mark (not shown) in the vicinity of the guide roller 112.

The tension device 109, 110 and 114 is then inserted into housing 100 whereupon the protective paper of the film roll is led on the reverse side of the tension device to the takeup spool and fastened thereto. Depending on whether the inserted film roll is of type "120" or "220", plate 241 is moved into a position such that curtain 240 shows the track of measuring tape 230 that refers to the type of film used and the other measuring tape track is covered (FIG. 7). Finally, the endless measuring tape 230 is brought into the predetermined zero position which, if required, can also take place automatically by means of a spring as soon as the cover is opened. After locking the cover 103, the device is ready for use.

By actuation of the transport lever 195, the takeup spool can be rotated in such a way that the strip-shaped protective paper of the film roll is spooled on the takeup spool and the film roll is pulled along. After each transport step in the longitudinal direction of the protective paper strip or of the film that corresponds to the dimension of the picture format set on the format selection knob 160, the film transport lock becomes effective in the following manner. During the film transport, the measuring drum 108 is driven by the protective paper or the film. The drum 108 in turn and by means of tooth gear 200 moves the toothed rod 201 in the longitudinal direction. When the sloping surface 203 on the end of the toothed rod 201 strikes against the step-segment 204, a crosswise force is exerted on toothed rod that causes a rotation of the toothed rod about point 202 (FIG. 12). Thereby, the toothed rod 201 pushes against the locking lever 210 and thereby tilts the lever towards the locking wheel 213 and the nose 212 of the locking lever engages with the teeth of locking wheel 213. In this manner, the shaft stub 190 that is coupled to the takeup spool 113 is locked against takeup rotation.

Actuation of the push button 214 (FIG. 11) releases the transport lock by removing the locking lever 210 from the locking wheel 213 by means of arm 224 and thus the lever is tilted away. At the same time, actuation of the push button 214 removes the tooth gear 200 from the teeth of toothed rod 201 by means of the forked lever 218 whereafter the lever returns into its original position under the influence of an undrawn spring.

By repeated alternate actuation of the transport lever 195 and the push button 214, the film is transported forward until cam 248 or 248a of the measuring tape 230 passes across the corresponding cam 257 of the control slide 255, whose location is dependent upon the picture format that has been set by means of knob 160. In this time, the section of the measuring tape that carries the cams 248 and 248a is pushed somewhat towards the interior and thus the sensor lever 258 is actuated which, in turn, actuates the feeler arm 225 so that the locking lever 210 is again tilted against the locking wheel 213 and the rotation of the shaft stub 190 that is coupled with the takeup spool 113 is stopped. The film roll 105 has now been advanced to a position such that its fore-running end is in the vicinity of the edge of mask 116, e.g. at location A in FIG. 3, and within the picture window corresponding to the selected picture format when later the masks 116 and 117 are brought into their open position. Now the transport lock is released once more by actuation of push button 214 and the film is transported a transport step corresponding to the adjusted picture format by means of the transport lever 195 until the transport lock again becomes automatically effective. A partial piece of light-sensitive film suitable for a photographic exposure is now located in an exposure position behind masks 116 and 117.

The entire device can now be attached to the back portion of a ground glass camera in a manner similar to the attachment of a conventional negative or film roll cassette. After attachment and closure of the camera shutter, the mask control knob is turned to "Open" whereby the two masks 116 and 117 move in opposite directions to form a picture window corresponding to the format selected on the format selection knob 160. After actuation of the camera shutter so that a latent photographic picture is produced on the film, push button 214 is pushed in order to release the film transport lock and then the transport lever 195 is actuated in order to transport the film in accordance with the length measurement of the produced latent image. At the end of the required transport step, the film transport lock again becomes effective. Prior to removing the mechanism from the camera, e.g. in order to view its ground glass and to adjust another picture motif, the masks must be brought into a locked position by turning the mask control knob to the "Closed" position in order to avoid an undesired exposure of a portion of the film 105. If, on the other hand, the mechanism is left mounted on the camera and the camera shutter remains closed until exposure of the next picture, the mask control knob 143 does not have to be actuated.

If it is desired to take the next photographic exposure with a larger picture format, then, after depressing push button 214 and releasing the film transport lock, the format selection knob 160 is turned until the indication of the desired picture format is juxtaposed to the reading mark 167 or 155, whereby the knob 160 takes a rest position as bolt 163 (FIG. 7) engages in one of the recesses 161 of the knob 160. Simultaneous with the turning of format selection knob 160, the shaft stub 190 (FIG. 12) is rotated by means of gears 260 and 261 by way of the freerun-locking coupling 262 so that takeup spool 113 is rotated in the takeup direction and the roll film is thereby advanced. The resulting correction in the transport step is at least as great as half of the difference between the prior-adjusted picture format and newly-adjusted picture format. In this manner, overlapping of the sequential latent photographic images is avoided. After the newly-selected picture format is set by means of knob 160, the film transport lock becomes effective since, while turning the knob 160, the capstan 280 causes the locking lever 210 to tilt towards the locking wheel 213. However, bolt 163 inhibited the locking lever 210 from engaging the locking wheel 213 since bolt 163 did not engage into one of the rest-recesses 161 of knob 160. After photographic exposure of the film with the selected larger format, the push button 214 must again be actuated and subsequently, the transport lever 195 must be actuated until the film transport lock again becomes automatically effective. Thereby, the roll film is transported forward for the next exposure in agreement with the length measurement of the adjusted picture format.

If it is desired to make the following exposure with a smaller picture format then, initially, the film transport lock must be released by actuation of the push button 214. After actuation, the format selection knob 160 is turned until the indication of the desired smaller picture format coincides with the reading mark 167 or 155. While turning knob 160, the shaft stub 270 is rotated by gears 265, 266 and 267 and the freerun-locking coupling 268 so that the coupled supply spool 106 is driven to take-up the film roll. In this manner, a reverse correction transport of the film by a step that is at least approximately equal to half of the difference between the prior adjusted, larger picture format and the newly selected, smaller picture format takes place. Consequently, unnecessary film loss between subsequent latent photographic pictures is avoided. When the newly-selected picture format is adjusted by means of knob 160, the film transport lock again automatically becomes effective in the previously described manner.

The two index slides 172 and 173 in the index window 170 permit the easy recognition as to position of the two masks 116 and 117 relative to the light-path opening 102, for example, whether the masks are in closed position or not. In addition, the amount of film material that has already then exposed and/or the amount that is still available for further exposures can be read in the index window 170 from the scales applied to the measuring tape 230. Since the index slides 172 and 173 preferably consist of transparent, colored material, the numbers applied to the measuring tape 230 are also visible in the closed position of index slides 172 and 173 and masks 116 and 117.

If, during a film transport process, cam 249 or 249a of the measuring tape 230 passes across corresponding cam 250 of the index slide 172, an acoustical signal is produced by means of the feeler lever 246 and the vibrating strip 247 which informs the photographer that only a predetermined remaining length of film material is available for further exposures, appropriately, sufficient only for one exposure with the largest possible picture format of 12×6 cm. After the initiated transport process has been carried to its normal conclusion corresponding to the adjusted picture format, it can read in index window 170 which picture formats are no longer permissible and if there is sufficient space on the film for the subsequent exposure. An exposure with smaller than the readable picture formats is, of course, still possible. After the next exposure or if it is decided to do without an exposure of a smaller format, the film roll and its accompanying protective paper strip can be spooled up completely onto the takeup spool 113 by the transport lever 195 under simultaneous depression of push button 214.

A closing means (not described) may be provided which inhibits the described mechanism from being removed from a camera when the two masks 116 and 117 are not in closed position. In the same manner, locking means (not described) can be provided that will lock masks 116 and 117 in a closed position when the mechanism is not properly fastened to a camera.

Although the described embodiment of the mechanism according to this invention is preferred because of its numerous advantages such as the variability of the format of the picture window between subsequent exposures on the same film roll and the automatic adjustment for the avoidance of overlaps and film loss due to changes in the format, for many applications, a technically simpler embodiment variation may be useful. Such an embodiment variation (not shown), for example, differs from the described mechanism as follows.

In the index window 170, the two index slides are eliminated, the curved discs 179 and 185 and levers 176 and 182 that work with them (FIGS. 7 and 9) also being superfluous. Further, the tooth gears 260 and 261 as well as the freerun-locking coupling 262 for the forward correction transport of the film upon the selection of a larger picture format are also eliminated. In the same manner, tooth gears 265, 266 and 267 as well as the freerun-locking coupling 268 for reverse correction transport of the film upon the selection of a smaller picture format are eliminated. Since a forward- or reverse-correction transport of the film upon changing of the picture format is therefore impossible, a certain film format must be selected in this embodiment variation during the introduction of the film and maintained for all photographic exposures on the same film. In order to prevent changing of the format selection knob 160 between exposures, a locking arrangement is provided for knob 160 that can be released only when the cover 103 of housing 100 is opened. For this purpose, a two-armed lever can be movably located in the housing such that one of its arms engages the rest-bolt 163 and the other arm of the lever is actuated by cover 103 when closed, so that with a closed cover, the lever secures the rest-bolt 163 into engagement with one of the rest-recesses 161 of knob 160. Finally, the acoustical signaller 246, 247 and the corresponding cams 249 and 249a on measuring tape 230 can also be omitted.

Another embodiment variation of the mechanism is also contemplated in which changing of the picture format between exposures on the same film is possible, but where a corresponding forward correction transport takes place only upon setting of a larger picture format, while the film is not reverse-transported on the selection of a smaller picture format. Thus, in this embodiment variation, an overlapping of subsequent pictures is avoided, however, the film loss between a picture of a larger format and a subsequent picture of a smaller format is not avoided.

FIGS. 14 to 22 represent a further embodiment of the mechanism according to this invention. This embodiment represents an improvement on the mechanism which is shown in FIGS. 1 to 13 and described in reference to those Figures. All parts and particulars of the first embodiment can also be found in the mechanism according to FIGS. 14 to 22. For the sake of simplicity, only those construction parts and effects that are not already present in the first embodiment are further explained in the following description.

Figure 14:
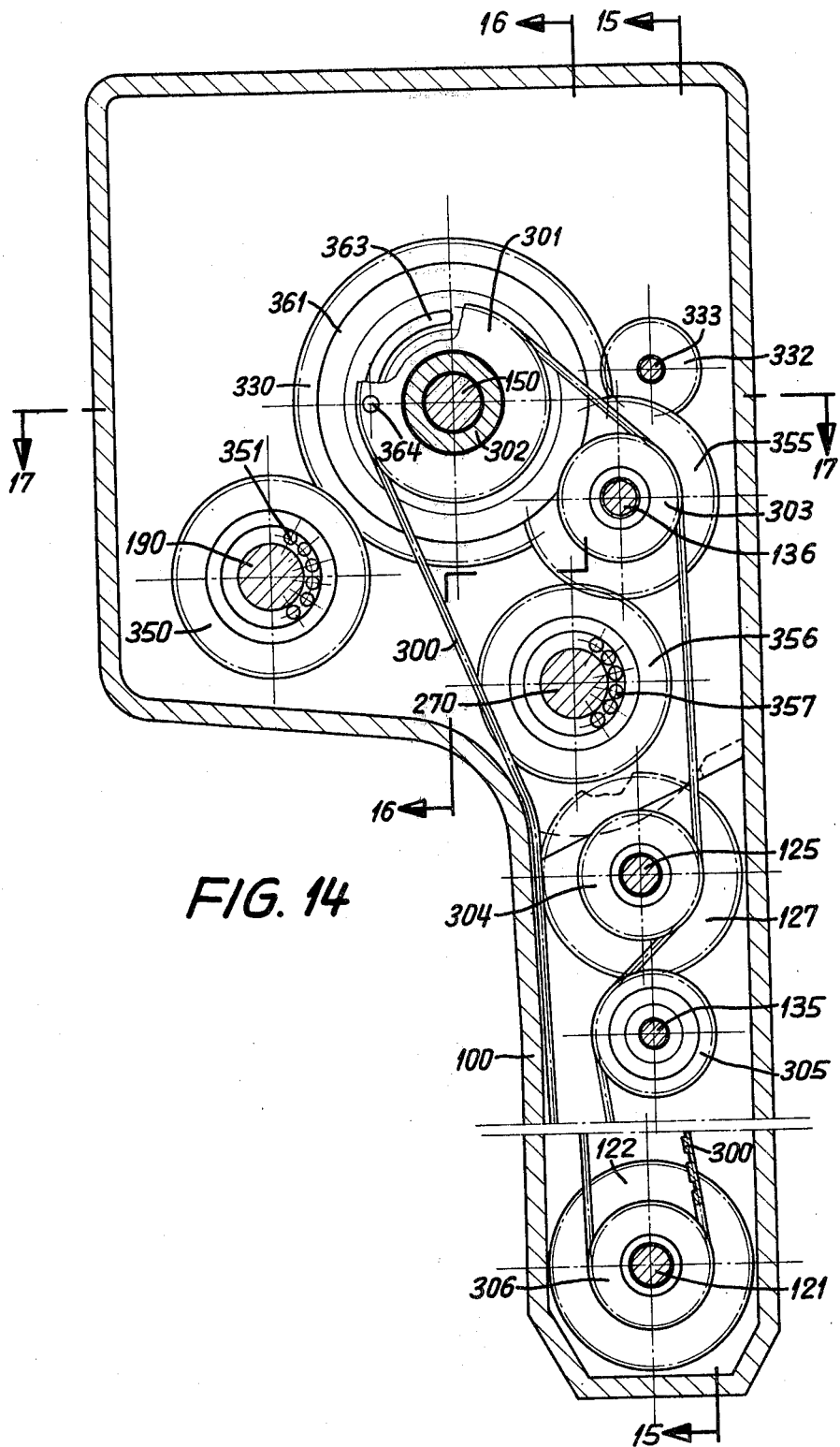
FIG. 14 is an additional embodiment of the device of the invention in a longitudinal section according to the line 14—14 of FIG. 15.
Figure 15:
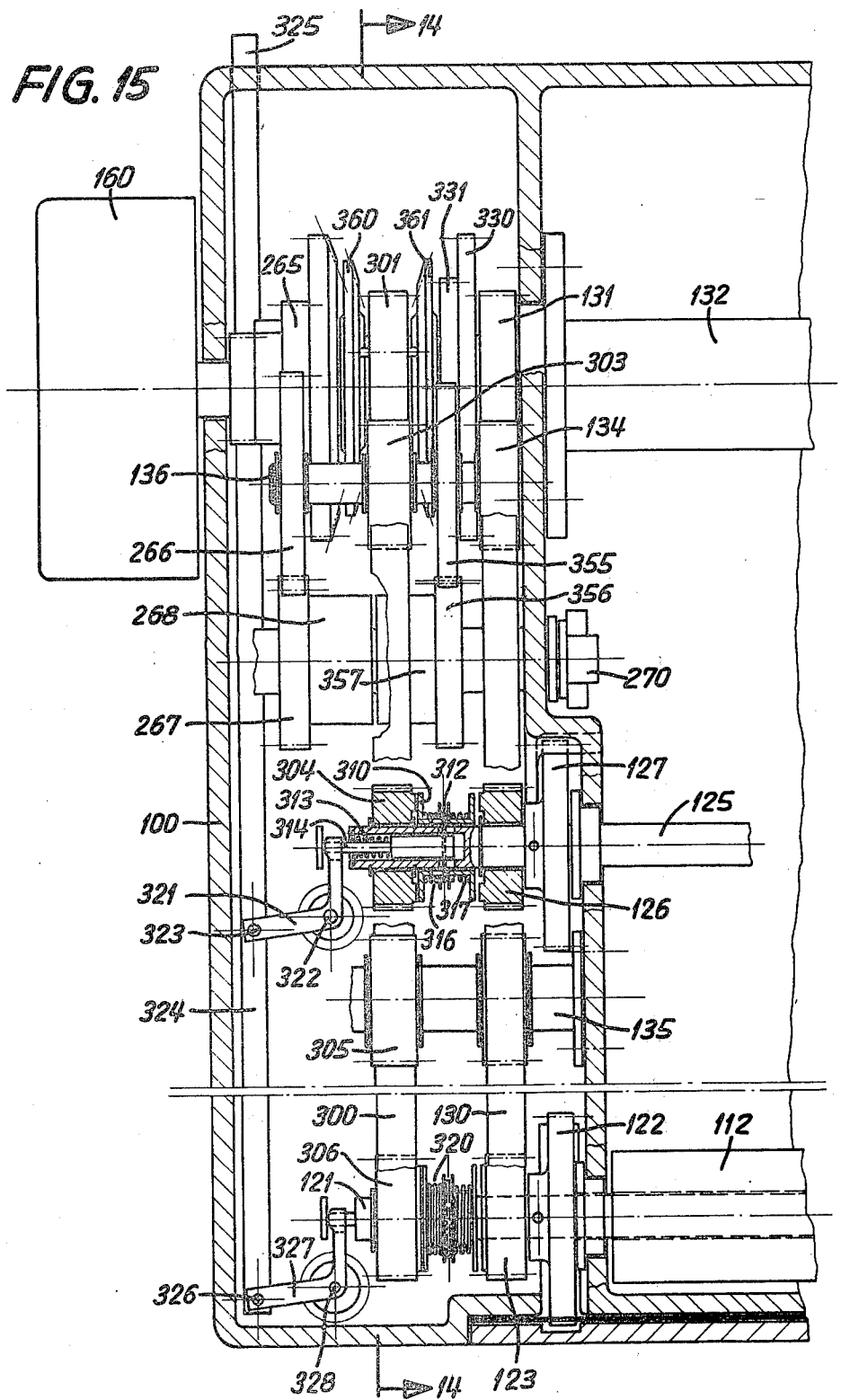
FIG. 15 is a partial longitudinal section according to line 15—15 of FIG. 14.
Figure 16:
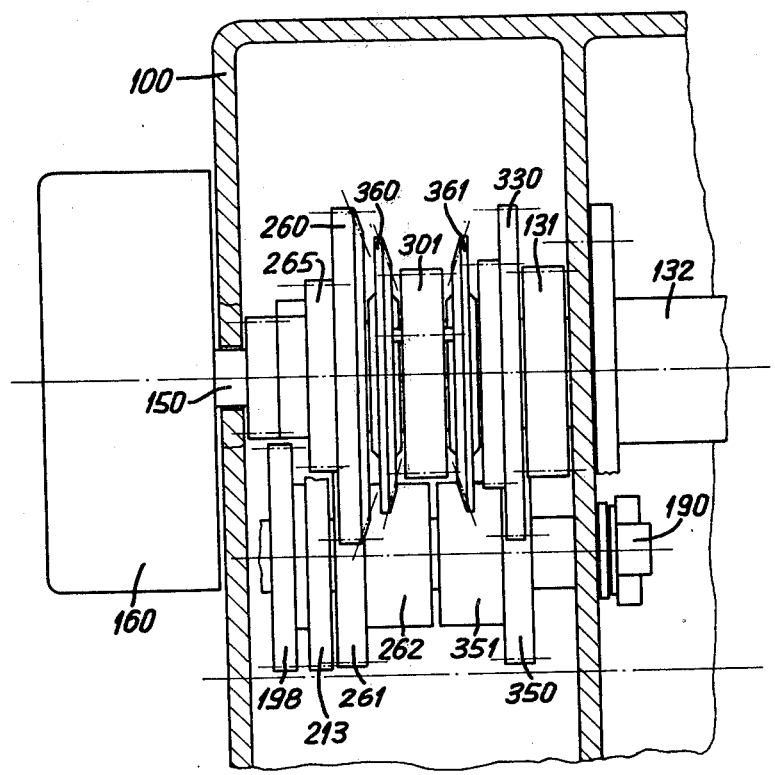
FIG. 16 is an analog, partial longitudinal section according to line 16—16 of FIG. 14.

According to FIGS. 14 and 15, an endless second toothed belt 300 is provided in addition to the toothed belt 130 (see FIG. 6) for the motion drive of the two masks 116 and 117. In contrast to the first toothed belt 130 the second toothed belt 300 is toothed only on one side. As is shown in FIGS. 14 and 15, the endless second toothed belt 300 passes over a toothed drive wheel 301 on hollow shaft stub 302 which surrounds and is rotatably mounted to shaft 150 carrying the format selection knob 160. Further, the toothed belt 300 passes over a toothed belt wheel rotatably mounted on shaft 136, a toothed belt wheel rotatably mounted on shaft 125, a toothed belt wheel 305 mounted on shaft 135 and a toothed belt wheel mounted rotatably on shaft 121.

It is to be remembered that shaft 121 carries the circumferentially toothed wheels 122 for the drive of the mask 117 and that shaft 125 carries the circumferentially toothed wheels 127 for the drive of mask 116. In contrast to the first embodiment, the two toothed wheel pairs 122 and 127 are not connected for solid rotation with the toothed belt wheels 123 or 126 that are assigned to the first drive belt 130, but the last-mentioned toothed belt wheels are mounted freely rotatable on shafts 121 and 125 in the same manner as toothed belt wheels 306 or 307.

As is shown in FIG. 15, a coupling shell 310 is located between the equiaxially arranged toothed belt wheels 126 and 304, said coupling shell being axially displacable along shaft 125 in order to be able to be brought into selective coupling engagement with the one or the other of the mentioned toothed belt wheels 126 and 304. The coupling shell 310 has two diametrically opposite longitudinal slits which are penetrated by the opposing ends of a coupling pin 312 passing diametrically through shaft 125. Shaft 125 has an axial recess in which a coupling bolt capable of longitudinal displacement is coaxially arranged. The previously-mentioned coupling pin 312 is guided in two juxtaposed longitudinal slits in shaft 125 and is fastened in a crossboring of coupling bolt 314. The coupling shell 310 is surrounded by two screw-compression springs 316 and 317, the ends of the coupling pin 312 being between the springs. The coupling bolt 314 is under the influence of pressure spring 313 which forces the coupling bolt into the recess of shaft 125 and thereby forces the coupling shell 310 into the toothed belt wheel 126 in a power-engaged manner by means of the coupling pin 312 and the pressure spring 317 and thus couples shaft 125 with the toothed belt wheel 126.

An equivalent coupling arrangement 320 is assigned to the two equiaxially arranged toothed belt wheels 123 and 306 as well as shaft 121.

One arm of two-armed angular level 321 contacts at its peak the end portion of coupling bolt 314 extending from shaft 125, the lever being rotatably mounted by joint 322 in housing 100. The other arm of angular lever 321 is connected to pushrod 324 by means of a joint 323, the pushrod traversing housing 100 in its longitudinal direction. End-portion 325 of the pushrod 324 extends from housing 100 and serves as a push button. Upon actuation of the pushrod 324, the coupling bolt 314 is dislocated by the force of spring 313 and angular lever 321 so that the coupling pin 312 under the influence of spring 316 forces the coupling shell 310 to the toothed belt wheel 304 in order to couple the wheel with shaft 125. At the same time, the toothed belt wheel 126 is decoupled from shaft 125. In analogous fashion, the push rod 324 is also connected to a second angular lever 327 by means of a joint 326. Secondary angular lever 327 is rotatably fastened by joint 328 in housing 100 and serves to actuate the second coupling device 320 so that shaft 121 is decoupled from toothed belt wheel 123 and is thereby coupled with toothed belt wheel 306.

Figure 17:
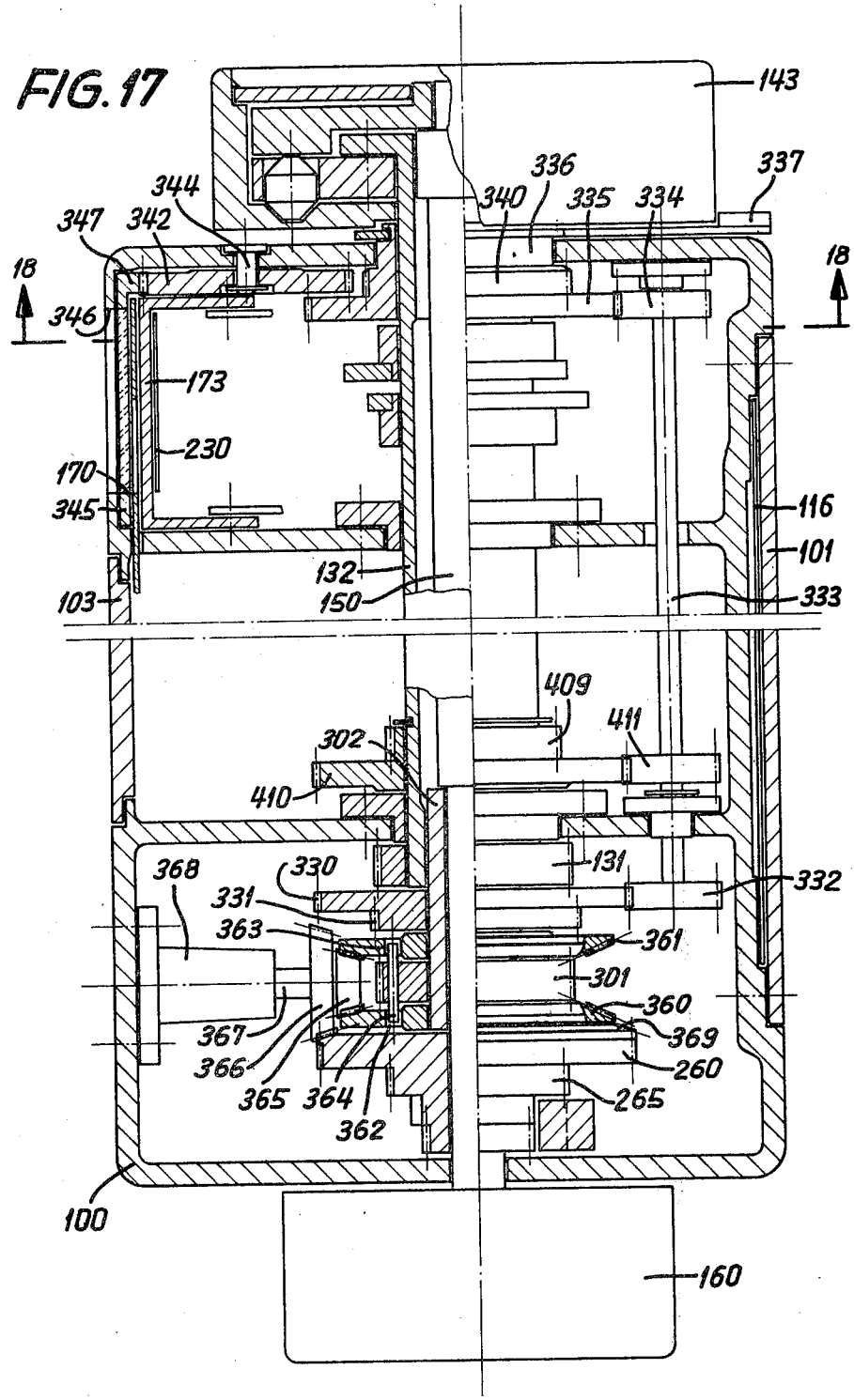
FIG. 17 is a cross-section according to line 16—16 of FIG. 14.

FIG. 17 shows hollow shaft stub 302 which carries drive wheel 301 for second toothed belt 300 also carries two tooth gears 330 and 331 which are connected to each other for rotation and are fixedly mounted on the hollow shaft stub. Tooth gear 330 is engaged with tooth gear capstan 332 fastened to the end of auxiliary shaft 333. The auxiliary shaft 333 is rotatably mounted in housing 100 and carries a further tooth gear capstan 344 engaging tooth gear 335 on its opposite end. Tooth gear 335 is mounted freely rotatable on hollow shaft 132 and includes boss 336 which extends out from housing 100 and is connected to tilt lever 337 located between the housing and the mask control knob 143. By actuation of the tilt lever 337, tooth gear 335 is turned, the movement being transferred by means of capstan 334 over auxiliary shaft 333, capstan 332 and tooth gear 332 to tooth gear 330 and hollow shaft stub 302 and therefore drive wheel 301 for second toothed belt 300. If end portion 325 of pushrod 324 which serves as a push button is depressed so that toothed belt wheels 304 and 306 are coupled with shafts 125 or 121 and, at the same time, swing lever 337 is actuated, toothed drive wheel pairs 127 and 122 for masks 116 and 117 are rotated in the same direction so that the masks are displaced equilaterally with respect to the light-path opening 102 of housing 100.

Figure 18:
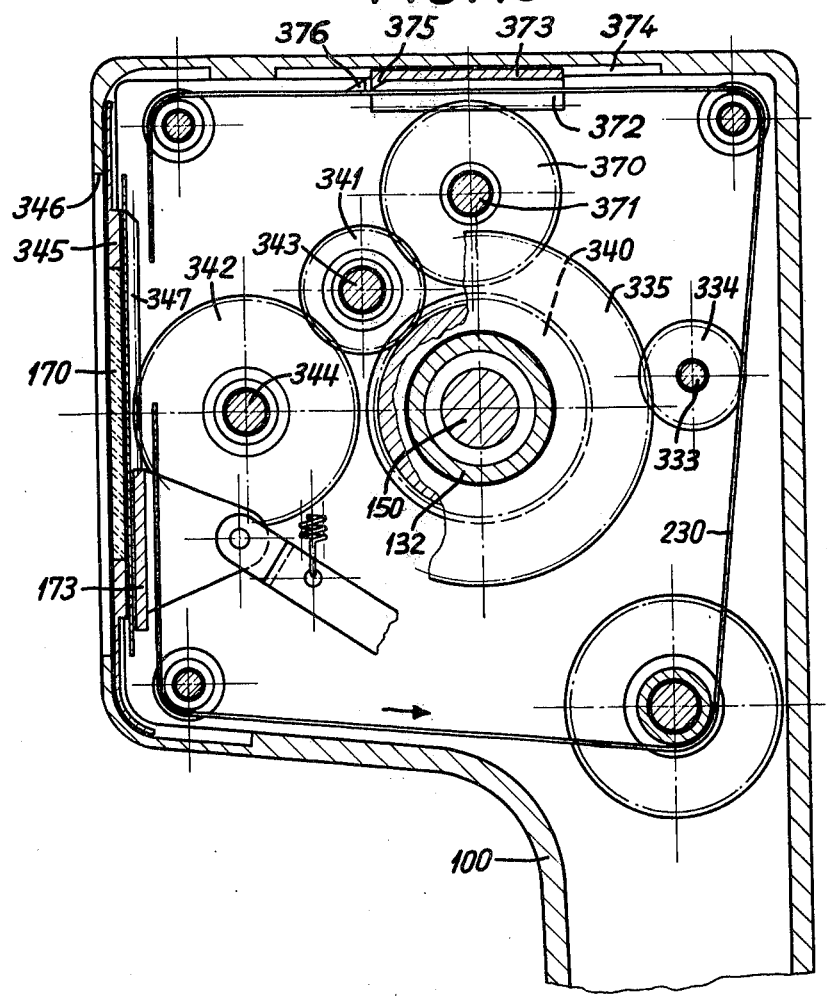
FIG. 18 is a partial longitudinal section according to line 18—18 of FIG. 17.

Another tooth gear 340 is fixedly connected to the previously-mentioned tooth gear 335 and the boss 336 and, as is shown in FIG. 18, is engaged with an intermediate tooth gear 341 which, in turn, is engaged with tooth gear 342. The intermediate tooth gear 341 and tooth gear 342 are rotatably mounted in housing 100 by axle 343 and by axle 344 respectively. In contrast to the first embodiment, in the presently-described embodiment of the mechanism according to this invention the indicator window 170 is located in displacable plate 345 which is movably guided on the inside of housing 100 and in the movement direction of index slides 172 and 173. In FIG. 18, only one of the index slides is shown for the sake of clarity. Exterior of plate 345, housing 100 has a viewing opening 346 larger than the indicator window 170. Plate 345 has a row of teeth 347 engaging with the previously mentioned tooth gear 342. Upon actuation of swing lever 337 for the purpose of equilateral displacement of masks 116 and 117, plate 345 with indicator window 170 are simultaneously displaced by tooth gears 340, 341 and 342 as well as tooth row 347 while index slides 172 and 173 remain in place so that the positions taken by masks 116 and 117 with respect to the light-path opening can be easily determined from the relative position of the index slides and the indicator window 170. The transmission of the drive formed by tooth gears 340, 341 and 342 is measured in such a way that between the equilateral displacement of masks 116 and 117 on the one hand and the analog displacement in the indicator window 170, the same reduction factor as between the opposing displacement movement of the masks and the corresponding, opposing displacement movement of the index slides 172 and 173 results.

Preferably, locking devices (not shown) are included which lock the swing lever 337 against actuation until the end of the pushrod 324 that serves as a push button is depressed. It is also possible to couple the pushrod 324 with a handle that has to be swung out for actuation of the swing lever 337, so that upon swinging out the mentioned handle and the subsequent actuation of the swing lever 337, the pushrod 324 automatically goes into a position in which the belt wheels 304 and 306 for the second drive belt are coupled with shafts 125 or 121.

The previously mentioned tooth gear 330 rotated by the swing lever is adjacent to capstan 332 and is also in engagement with tooth gear 350 as is shown in FIG. 14. The tooth gear 350 is engaged by a second freerun-locking coupling 351 located on shaft stub 190 for the drive of takeup spool 113. The freerun-locking coupling 351 is designed such that during an equilateral displacement of the two masks 116 and 117 in the direction of the forward transport of the film roll, the turning motion of tooth gear 350 is transferred to shaft stub 190 and therefore also to the takeup spool 113 to take up film, but not, however, transferred during an opposed equilateral displacement of the masks. The transmission of the drive formed by tooth gears 330 and 350 is designed such that when the masks 116 and 117 are displaced a freely selected distance in the direction of the forward transport of the film, the rotation of takeup spool 113 transports the film at least the same distance forward even if the spool diameter of the film on spool 113 is still minimal.

The tooth gear 331 (FIG. 17) which can also be driven by swing lever 337 engages tooth gear 355 (FIGS. 14 and 15) which is freely rotatably mounted on shaft 136 carrying toothed belt wheel 303 and partially engages tooth gear 356. Tooth gear 356 is engaged by second freerun-locking coupling 357 and is located on shaft stub 270 for the drive of the supply spool 106 for the film roll. The freerun-locking coupling 357 is designed such that when the two masks are equilaterally displaced counter to the direction of the forward transport of the film roll, the rotating motion of tooth gear 356 on the shaft stub 270 is transferred and, therefore, also to the supply spool 106 to spool the film. However, the motion is not transferred during the reverse equilateral displacement of the masks. The transmission of the drive formed by tooth gears 331, 355 and 356 is designed such that when the two masks are displaced a freely selected distance counter to the direction of the forward transport of the film, the rotation of supply spool 106 transports the film backward by approximately the same distance even if the angular diameter of the film on spool 106 is a maximum.

According to FIGS. 14 and 17, conical wheel discs 360 and 361 are mounted freely rotatable on hollow shaft stub 302, one on each side of drive wheel 301. Each of conical wheel discs 360 and 361 has a slit 362 or 363 which runs in the circumferential direction on the disc and extends over a curve angle of about 180°. Located in an eccentric axial hole of drive wheel 301 is a pin 365, the end portion of which projects into the slit of the one conical wheel disc 360 while the other end portion projects into the slit of the other conical wheel disc 361 as is shown in FIG. 17. The circumference of the facing sides of the two conical wheel discs 360 and 361 are each provided with a bevel gear which engages bevel gear 365 common to both of these conical wheel discs. Bevel gear 365 and a further, larger bevel gear 366 are located equiaxially on shaft 367 and are fixedly connected to each other. Shaft 367 is rotatably mounted in housing 100 by means of supporting bracket 368. Second bevel gear 366 engages bevel gear rim 369 on the tooth gear 260 fastened to shaft 150. As has already been explained in conjunction with the first embodiment with reference to FIG. 12, tooth gear 260 is engaged with tooth gear 261 which, by means of the free-run-locking coupling 262, is mounted on shaft stub 190 for the purpose of driving takeup spool 113.

The two conical wheel discs 360 and 361, pin 364 fastened to the belt drive 301, bevel gears 365 and 366 and the bevel gear rim 369 which is connected to the format selection knob 160 by means of shaft 150 together form a limiting mechanism which limits the counter-directional movability or displacement of the masks 116 and 117 for changing of the picture format and the parallel variability of the masks for the displacement of decentration of the picture window with respect to each other. If the format selection knob 160 is turned, tooth gear 260 and bevel gear rim 369 located on it are turned in the same measure. In this manner, bevel gear 366 is rotated whereby bevel gear 365 drives the two conical wheel discs 360 and 361 in opposite directions. During this rotation, the circular curved slots 362 and 363 move against each other. As soon as one end of one of the slits contacts pin 364, the format selection knob 160 can no longer be turned in the same direction. If, inversely, the format selection knob is left in one of its recess positions and the two masks 116 and 117 are moved in the same direction by the swing lever 337, the two conical wheel discs 360 and 361 are stationary, while toothed belt wheel 301 is being turned. In this situation, pin 364, which is fixedly connected to the mentioned wheel, slides in the bow-shaped slits 362 and 363 of the conical wheel discs. As soon as pin 364 reaches one end of one of the mentioned slits, the swinglever can no longer be swung further in the same direction and masks 116 and 117 are stationary.

Figure 19:
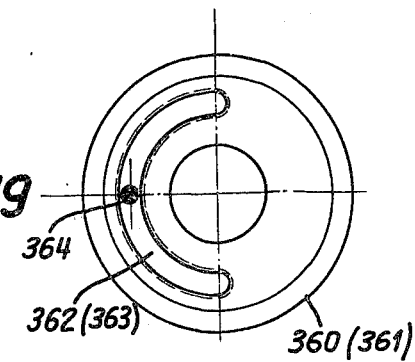
FIGS. 19 to 22 are schematic presentations of some of the structural parts of the device at various picture window settings.
Figure 19A:
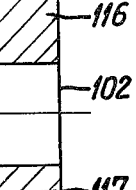
Figure 20:
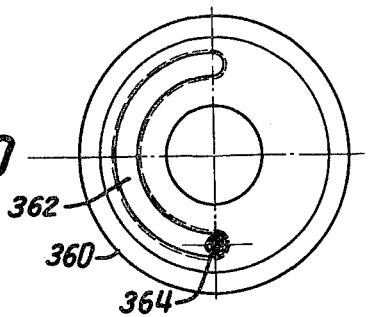
Figure 20A:
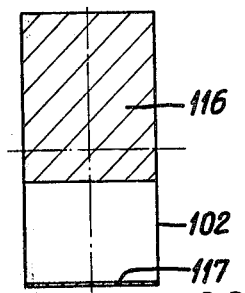
Figure 21:
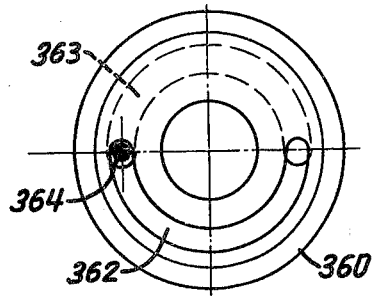
Figure 21A:
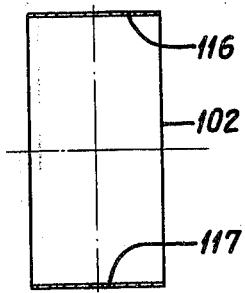
Figure 22:
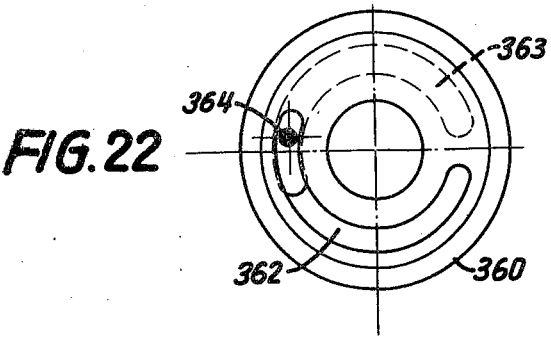
Figure 22A:
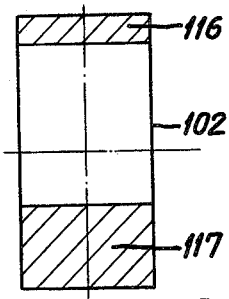

Slits 362 and 363 have a location and size such that they assume identical positions with respect to each other when the smallest format, e.g. 4.5×6 cm has been selected on format selection knob 160 as is schematically shown in FIG. 19 and such that pin 364 just touches the one end of slit 362 and 363 when the smallest possible picture format is set and when the two masks 116 and 117 have been displaced in the same direction by swing lever 337 such that the picture window remaining open between the masks directly adjoins one of the edges of light-path opening 102 which is at right angles to the transport direction of the film roll as is schematically shown in FIG. 20. When the described conditions are met, the largest possible picture format, e.g. 12×6 cm, can be set by means of the format selection knob 160 only when the swing lever 337 takes in its center position which corresponds to the centered position of the picture window. In this case, pin 364 is held between one end of slot 362 and the opposite end of slit 363 as is shown in FIG. 21. Decentering of the picture is naturally not possible in this case and is also prevented by the holding of pin 364. Finally, FIG. 22 schematically shows the positions of slots 362 and 363 and pin 364 with respect to each other when a medium sized picture format, e.g. 7.2×6 cm, is selected on the format selection knob 160 and the swing lever 337 is swung somewhat from its center position so that the picture window left open by the two masks 116 and 117 is somewhat decentered with respect to the center of the light-path opening 102.

As is shown in FIG. 18, a further tooth gear 370 engages with the previously mentioned tooth gear 341, the tooth gear 370 being mounted freely rotatable on shaft 371 attached to housing 100. Tooth gear 370 is partially engaged with a series of teeth 372 on stop slide 373 which is guided in a straight line within guide recess 374 in housing 100 and along measuring tape 230. The stop slide 373 has a drop cam 375 which protrudes towards measuring tape 230 and which works together with cam 376 of the measuring tape in order to specify the original or zero position of the measuring tape 230 prior to or during the insertion of a film roll into the mechanism. The transmission of the drive that is formed by the tooth gears 340, 341 and 370 and the tooth series 372 is in exactly the same relation to the transmission of the corresponding means 300, 301, 304, 127, 306 and 122, serving the unilateral drive of masks 116 and 117, as the movement of the measuring tape 230 is with respect to the movement of the film, e.g. 1:5.

The manner of use and effectiveness of the previously described mechanism, insofar as it differs from that of the first embodiment, is briefly as follows:

If swing lever 337 is in its mid-position, the mechanism can be used, according to FIGS. 14 to 22, in exactly the same manner as was described with respect to the first embodiment. Additionally, however, the possibility is provided to displace the picture format, selected and set by the format selector knob 160, in relation to the center of the light-path opening 102, i.e. to decenter it, as long as the format selected is smaller than the light-path opening. Decentering is accomplished by swinging the swing lever 337 in one or the other direction from its central position while, simultaneously, depressing the end-part 325 of the pushrod 324 that serves as a push button. As was previously explained, the actuation of the pushrod 324 results in shafts 125 and 121 being decoupled from the toothed belt wheels 126 and 123 that are assigned to first drive belt 130 and instead, being coupled to toothed belt wheels 304 and 306 that are assigned to drive belt 300. By the actuation of swing lever 337, drive belt 300 is driven which, by means of the toothed belt wheels 304 and 306, drives shafts 125 and 121 as well as wheel pairs 127 and 122 fastened to the shafts. A unidirectional displacement of the two masks 117 and 116 results and the picture window that is left free between the masks thus assumes a decentered position within the light-path opening 102.

Upon unidirectional displacement of masks 116 and 117 in direction of the forward transport of the film roll from the supply spool 106 to the takeup spool 113, a forward correction transport of the film by at least the same distance results since shaft stub 190 for the drive of the takeup spool 113 is driven to take up the film by tooth gears 330 and 350 as well as the freerun-stop coupling 351. The removal of film from the supply spool 106 is possible because freerun-stop couplings 268 and 357 located on shaft stub 270 coupled to the supply spool turn freely. When the two masks 116 and 117 are displaced unidirectionally in the direction opposing the forward transport of the film roll, a reverse correction transport of the film by at least approximately the same distance takes place because the tooth gears 331, 355 and 356 as well as freerun-stop coupling 357 drive the shaft stub 270 for the drive of the supply spool 106 in the direction for spooling of the film. In this case, freerun-stop coupling 268 that is arranged on the same shaft runs freely. Upon the reverse correction transport of the film, the film can be readily removed from the takeup spool 113 since freerun-stop couplings 262 and 351 attached to the shaft stub 190 can turn freely. Therefore, upon decentering of the picture window, neither overlaps of sequential latent images or film losses between sequential pictures occur.

By means of the mask control knob 143, the masks 116 and 117 may be moved into closed position in which the light-path opening 102 is completely closed and the film is protected against incident light, the movement of the masks being independent of the picture format set by the format selection knob 160 and independent of the decentering of the picture window due to displacement of swing lever 337. If the mask control knob is turned from the "Closed" position to the "Open" position, the masks 116 and 117 move only enough to release the picture window that corresponds to that which has been set with the format selection knob 160 and the picture window automatically assumes the established centered or decentered position with respect to the center of the light-path opening set by means of swing lever 337.

During the description of the first embodiment, it was explained in detail how, in the opposed movement of masks 116 and 117, the index slides 172 and 173 were also moved in analogous manner. The same type of function also results in the presently described embodiment. Additionally, in the second embodiment, a unidirectional displacement of masks 116 and 117 by swing lever 337 also causes an analogous displacement of plate 345 that includes indicator window 170 (FIG. 18) so that the relative position of the index slides 172 and 173 in relation to the contours of the indicator window 170 changes analogous to the location of masks 116 and 117 in relation to the contours of the light-path opening 102. Thus, in the indicator window 170, both the contours of the indicator window 170 are visually presented by the index slides 172 and 173 as to which positions are taken by the masks 116 and 117 with respect to light-path opening 102, whereby not only does the respective format of the picture window held open by the masks become recognizable, but also the location of the picture window within the light-path opening.

If, by means of actuating the swing lever 337, the masks 116 and 117 or the picture window that is left open by the marks are brought into a decentered position with respect to light-path opening 102, then simultaneously, by means of drive 340, 341, 370 and 372, stop slide 373 is also appropriately displaced so that stop cam 375 on the slide 373 changes its position (FIG. 18). In this manner, the beginning- or zero-position of the measuring tape 230 which is determined by the meeting of the measuring tape cam 376 on cam 375 of stop slide 373 is changed analogously to the decentering of masks 116 and 117 or to the picture window that is defined by the masks.

Thus, upon loading the film roll while swing lever 337 is in a position deviating from the center position, the beginning of the exposable film material automatically reaches the proper starting position thereby preventing the first photographic picture from being positioned partially on the protective forerunning paper and preventing an unnecessarily large, unused empty space between the start of the film and the first photographic picture.

Figure 23:
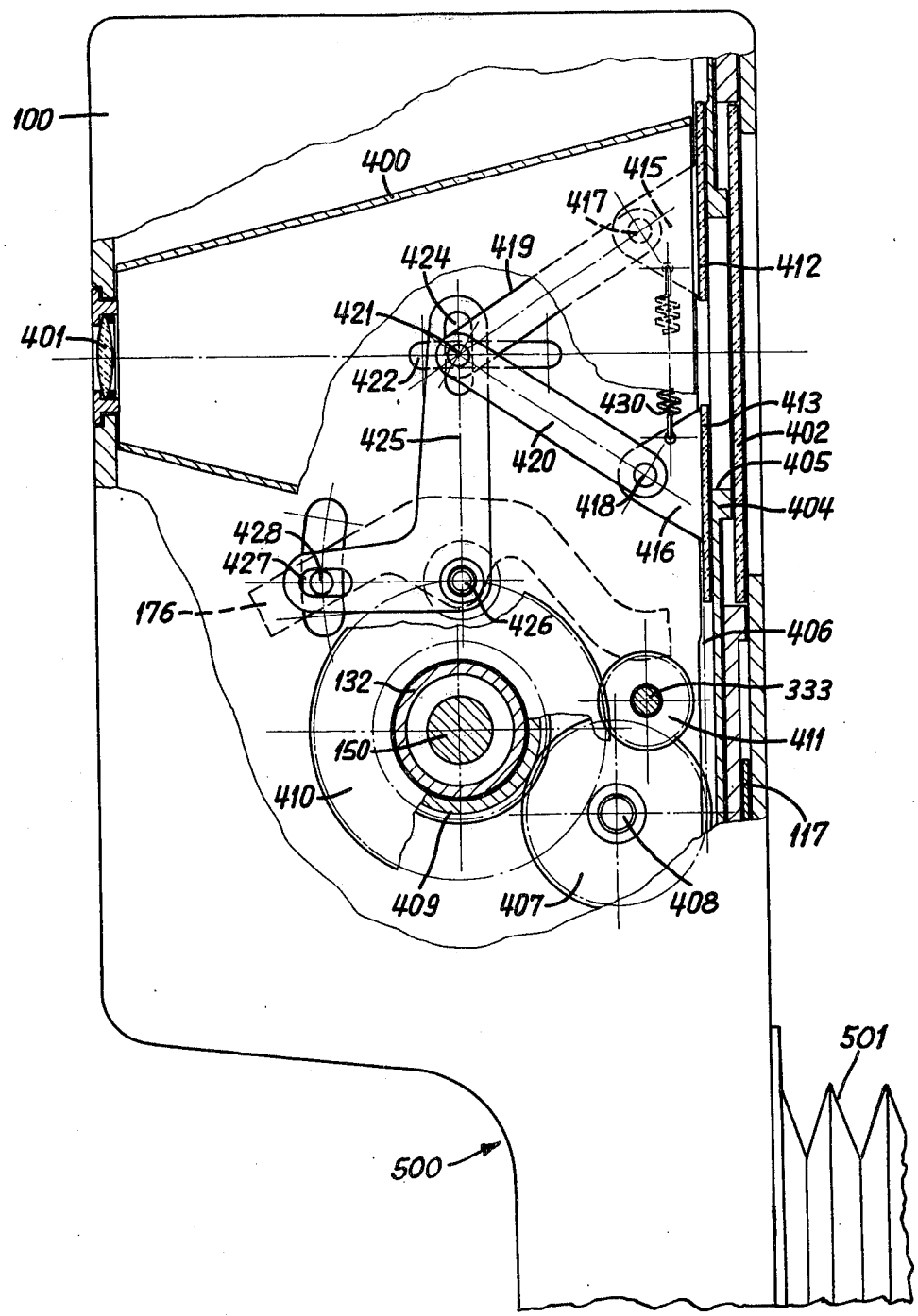
FIG. 23 illustrates a partial longitudinal section through a supplement to the embodiment of the device of the invention shown in FIGS. 14 to 22.

FIG. 23 shows a supplementary development for the last-described embodiment having a picture window that can be decentered. This embodiment has, in addition to the construction parts described in FIGS. 14 to 22, a viewer arrangement for aiming towards the object to be photographed. The viewing arrangement includes a light duct 400, eye piece 401 and front lens 402. On the interior side of front lens 402 is plate 404 with a viewing opening 405 having dimensions proportional to the dimensions of the light-path opening 102. Plate 404 is arranged movably in the direction of the longer direction of opening 405 and has a tooth sequence engaged by tooth gear 407. Tooth gear 407 is rotatably mounted on shaft 408 in housing 100 and is engaged by a tooth gear 409. Tooth gear 409 is mounted freely rotatable on hollow shaft 132 and is connected for rotation with a further equiaxially arranged tooth gear 410 (see also FIG. 17). Tooth gear 410 engages tooth gear pinion 411 which is fixedly located with respect to the previously mentioned auxiliary shaft 333 (FIG. 17). Shaft 333 is rotated by movement of swing lever 337. Thus, upon unilateral displacement of masks 116 and 117 by the movement of swing lever 337, plate 404 is displaced in an analogous manner by auxiliary shaft 333 and tooth gears 411, 410, 409 and 407 so that viewing opening 405 of plate 404 assumes an analogous position to that of the picture window opened by masks 116 and 117.

Located on the side of plate 404 that is turned inwards are format-indicator masks 412 and 413 which are also movably guided in the direction of the longer dimension of the viewing opening 405 and which consist appropriately of transparent colored material. The format-indicator masks 412 and 413 have lips 415 and 416 extending towards and connected with leaders 419 and 420 by joints 417 and 418. Leaders 419 and 420 are coupled to each other by pin 421 projecting into a pair of guide slits 422, only one of which is visible in FIG. 23. Guide slits 422 extend perpendicular to the plane in which the format-indicator masks 412 and 413 are movable. Pin 421 also passes through a slit 424 in the arm of angular lever 425 rotatably mounted in housing 100 by a joint at its peak. The other arm of angular lever 425 has a slit 427 through which catch pin 428 extends. Catch pin 428 is fastened on lever 176 for the control of index slide 172. In this way, upon each adjustment of index slides 172 and 173, the two format-indicator masks 412 and 413 are displaced in an analogous manner by pin 428, the angular lever 425, pin 421 and leaders 419 and 420 so that masks 412 and 413 permit the recognition of the present position of masks 116 and 117 in the same manner as index slides 172 and 173. Lips 415 and 416 are connected to each other by spring 430 which forces format-indicator masks 412 and 413 towards each other.

When looking through eye piece 401, the outlines of viewing opening 405 are visible through format-indicator masks 412 and 413. Therefore, it can be seen whether and how the picture window that has been left free between the format indicator masks 412 and 413 and, therefore also between masks 116 and 117, is displaced in relation to the center of viewing opening 405 and the light-path opening 102. At the same time, the motif that is to be photographed can also be seen through opening 405 and a judgment on the motif in relation to the adjusted picture window can be made. In this manner, it is relatively easy to bring the picture window into the most appropriate position and to adjust the most suitable format in order to later obtain a photographic exposure of the desired motif section.

The previously described embodiment of the mechanism of this invention is also suitable for use on a camera without ground glass adjustment since the motif to be photographed in the viewer arrangement can be observed and thus a judgment can be made. In this case, the index slides 172 and 173 behind the indicator window can be eliminated so that only measuring tape 230 with data on the used and still available film will be visible in the indicator window.

It is obvious that the first embodiment as described in FIGS. 1 to 14 of the device of this invention (without the capability of decentering of the picture window) can also be provided with a viewer device of the type shown in FIG. 23 wherein, however, the indicator windows 405 are fixedly arranged and tooth ears 409 and 407 are eliminated.

While purely mechanical means are provided for the movement of masks 116 and 117 in all the previously described embodiments of the invention, for the production of a visual indication of each position of the masks, for the indication of each position of the strip-form, light-sensitive material and for the forward- and reverse correction transport of the strip-form material upon changing the picture format or upon the displacement of the picture window within the light-path opening 102, naturally other types are possible for the mechanism according to this invention in which at least a part of the functions could take place by electrical, electromechanical or electronic means. Instead of the cams 248, 248a, 249, 249a, the measuring tape 230 can just as well be provided with differently arranged control information such as electrical contact areas, magnetic layers or perforations that can be detected by suitable stationary detector or sensing devices when the measuring tape is moved. Measuring tape 230 can also, if necessary, be replaced by a rotatable disc or drum.

The mechanism according to the present invention need not be executed in every case as a camera-independent cassette that is applicable selectively on various cameras instead of the usual negative cassette. Instead, it is also possible and for many purposes advantageous to design the mechanism according to the invention in the form of a solid, integrated part of a photographic camera such as is shown, for example, in FIG. 23. In this instance, the light-tight housing 100 is the reverse portion of a camera 500 with a bellows 501 that is arranged in known manner between housing 100 and an objective carrier of the camera (not shown). The parts 400, 401, 402, 403 and 405 that have been described in reference to FIG. 23 form a viewer for the viewing of the motif to be photographed and format indicator masks 412 and 413 indicate in the viewer picture, the picture format that has been set by masks 116 and 117.

As a further example of a camera of which the device according to this invention is an integrated part, a single-lens reflex camera may be mentioned. In such a camera, the masks (analogous to masks 116 and 117) for the partial or complete covering of the light-path opening of the picture field limiting frame are located directly in front of the light-sensitive material and models of the mentioned masks (analogous to the index slides 172 and 173) are located directly in front of or behind a viewer ground glass of the camera. A measuring tape or other equivalent device provided with data on the used and/or yet available unused light-sensitive material can then also pass through the area of the viewer ground glass and the measuring tape or the like can also have cams (analog to cams 248, 248a, 249 and 249a) for the control of certain functions. When the mechanism according to this invention is an integrated part of such a camera, the masks need not necessarily be capable of being brought into a completely closed position, e.g., if the camera has a slit shutter in front of the plane containing the light-sensitive material.

The described embodiment of the mechanism according to this invention offer the photographer, especially the professional photographer, a number of advantages, the most important of which are set forth below. Photographic exposures with various picture formats are possible without requiring several camera or cassettes. The requirement for established dimensional relationships of the picture format is eliminated thereby permitting a more optimal design of the picture. Panoramic exposures with a side relationship of 1:n are also possible, whereby n, for example, is 2 or more. The picture format can be adapted to the motif to be exposed in order to obtain a better picture quality, e.g. in a manner that a larger format is selected for a motif that is richer in detail. Upon application to cameras with exchangable lenses, the necessity for exchanging lenses can be reduced. In the same manner, one can, in many cases, do without the use of an objective with variable focus, something that is useful or necessary in the case of medium- or large-format cameras. The capability of decentering the picture window within the light-path opening of the picture limiting frame permits, for example, avoidance of tilting lines in photographic exposures of structures, something that can otherwise only be accomplished by cameras with movable backs of movable objective carriers, or with the aid of special objectives whose fitting is capable of being displaced at right angles to the optical axis.

We claim:

1. Device for use in making photographic exposures on a strip-shaped light-sensitive material comprising a housing having a light-path opening, a picture area limiting frame enclosing the light-path opening, means for guiding the strip-shaped light-sensitive material behind the picture area limiting the frame and the light-path opening, a transport arrangement for the forward transport of the strip-shaped material in steps in its longitudinal direction, at least one adjustable mask for covering portions of the light-path opening thereby forming a picture window smaller than the picture area limiting frame, the portions of the light-path opening which can be covered by the mask adjoining opposite edges of the light-path opening that are at right angles to the longitudinal direction of the strip-shaped material so that a first edge of the picture window as well as a second edge of the picture window as seen in reference to the forward transport direction of the strip-shaped material are alterable in position by displacement of the mask, control means for the automatic limitation of the steps of forward transport caused by the transport arrangement of the strip-shaped material in adaptation to the size of the picture window defined by the mask, means for selecting a desired picture window and unidirectional linking means interconnected between the means for selecting the picture window and the transport arrangement for the strip-shaped material such that each adjustment of the means for selecting the picture window, which calls for a position change of the second edge of the picture window in the forward transport direction of the strip-shaped material automatically produces a a forward correction transport of the strip-shaped material at least equal to said position change.

2. Device according to claim 1, wherein the transport arrangement includes a takeup spool for the strip-shaped material, said unidirectional linking means being operatively coupled to the takeup spool so that each adjustment of the means for selecting the picture window, which calls for a positional change of the second edge of the picture window in the forward transport direction of the strip-shaped material, produces an angular movement of the takeup spool in such a manner that at a predetermined winding diameter below the mean diameter of the takeup spool, said forward correction transport of the strip-shaped material is achieved.

3. Device according to claim 1, further including a transport arrangement for a reverse transport of the strip-shaped material, and a second unidirectional linking means interconnected between the means for selecting the picture window and the transport arrangement for the reverse transport such that each adjustment of the means for selecting the picture window, which calls for a positional change of the second edge of the picture window counter to the forward transport direction of the strip-shaped material, automatically produces a reverse correction of the transport of the strip-shaped material at most equal to said position change.

4. Device according to claim 3, wherein the transport arrangement for the reverse transport of the strip-shaped material includes a supply spool for the strip-shaped material, said second unidirectional linking means being operatively coupled to the supply spool so that each adjustment of the means for selecting the picture window, which calls for a displacement of the second edge of the picture window contrary to the forward transport direction of the strip-shaped material produces an angular movement of the supply spool in such a manner that at a predetermined winding diameter above the mean diameter of the supply spool, said reverse correction transport of the strip-shaped material is achieved.

5. Device according to claim 1, wherein the picture window is changeable both in size and in location within the light-path opening by adjustment of said at least one mask.

6. Device according to claim 5, wherein two adjustable masks are included, each mask extending from opposite sides of the light-path opening in the longitudinal direction of the strip-shaped material and capable of covering a portion of the light-path opening, and said means for selecting the picture window including a first control arrangement for adjusting the two masks by equal opposing movement of the masks and a second control arrangement for adjusting the masks by equal unidirectional movement of the masks.

7. Device according to claim 1, wherein the location of the picture window is capable of being varied within the light-path opening by adjustment of the at least one mask while the size of the window is maintained.

8. Device according to claim 7 wherein two adjustable masks are included, each mask extending from opposite sides of the light-path opening in the longitudinal direction of the strip-shaped material and capable of covering a portion of the light-path opening, said means for selecting the picture window including a control arrangement for adjusting the masks by equal unidirectional movement of the masks.

9. Device according to claim 1, wherein the at least one mask is capable of being brought into a position completely closing the light-path opening.

10. Device according to claim 9, further including means for moving the at least one mask into position totally closing the light-path opening and into an open position corresponding to the selected picture window, said means for moving the mask being independent of the means for the selection of the picture window and of the unidirectional linking means.

11. Device according to claim 1, further including an indicator field and an optically recognizable indicator organ with continuous length indications concerning the strip-shaped material and means for the drive of the indicator organ analog to the transport of the strip-shaped material, the indicator organ carrying control information for the automatic control of functions.

12. Device according to claim 11, further including means for limiting the forward transport of the strip-shaped material required prior to the first photographic exposure from a specific original position, that means being controlable by at least one control information of the indicator organ, a stationary detector organ for the detection of the mentioned control information being provided on a member capable of being adjusted in and opposing to the directional movement of the indicator organ and control means for the adjustment of the member analog to the location adjustments of the second edge of the picture window, the relationship of the adjustment movement of the member for the adjustment movement of the second edge of the picture window being equal to the relationship of the movement of the indicator organ to the movement of the strip-shaped material.

13. Device according to claim 11, further including means for signalling that only a specific remaining length of the strip-shaped material is available for further exposures, said signalling means being controlable by at least one control information of the indicator organ, and a stationary detector organ for the detection of the control information.

14. Device according to claim 13, wherein the stationary detector organ is located on a member which is adjustable in and counter to the motional direction of the indicator organ, and control means for the adjustment of the member analog to the position adjustments of the second edge of the picture window are provided, the relationship of the adjustment-movements of the member to the adjustment movement of the mentioned second edge of the picture window being equal to the relationship of the movement of the indicator organ to the movement of the strip-shaped material.

15. Device according to claim 12, wherein the indicator organ carries control cams that represent the control information.

16. Device according to claim 11, wherein the picture window is changeable both in size and in location within the light-path opening by adjustment of the at least one mask and wherein the indicator organ carries at least one stop-cam that is arranged to cooperate with a stationary stop-cam to indicate the zero position of the indicator organ, the stationary stop-cam located on the adjustable member that is adjustable in the motion-direction of the indicator organ, and the device includes control means for the adjustment of the adjustable member analog to the position adjustment of the picture window, the relationship of the adjustment-movement of the adjustable member to the displacement adjustment of the picture being equal to the relationship of the movement of the indicator organ to the movement of the strip-shaped material.

17. Device according to claim 11, wherein the indicator organ contains at least two rows of different length data for various length strip-shaped materials, each row of the different length data being assigned different individual control information for the different lengths of strip-shaped materials, and an adjustable cover member is provided for the selective covering of the length data not applicable to the strip-shaped material used, one part of the control information being automatically selectable by adjustment of the cover member.

18. Device according to claim 1, including an indicator field containing optically visible models of the light-path opening and the mask as well as means for the control of the model of the mask analog to the adjustment of the picture window to thereby produce a visual indication of the picture window adjustment in relation to the contours of the light-path opening, wherein the indicator organ and the models of the light-path opening and the mask are simultaneously optically visible in the same indicator field and the means for the control of the model of the mask and the means for the drive of the indicator organ are connected to each other in a manner such that the ratio of the movement of the model to the movement of the mask is equal to the ratio of the movement of the indicator organ to the movement of the strip-shaped material.

19. Device according to claim 18, wherein the indicator organ is located in the area behind the models of the light-path opening and the mask.

20. Device according to claim 1, wherein the device is designed as a camera-independent cassette adapted for attachment to various photographic cameras.

21. Device according to claim 1, wherein the device is an integrated part of a photographic camera.

* * * * *